(12) United States Patent
Burch, II et al.

(10) Patent No.: US 12,310,533 B2
(45) Date of Patent: May 27, 2025

(54) MODULAR GRILL AND BURN BARREL

(71) Applicant: Burch Barrel, LLC, King of Prussia, PA (US)

(72) Inventors: Robert L. Burch, II, King of Prussia, PA (US); Andrew Jordan, Wilmington, DE (US); Alexander Undi, Huntingdon Valley, PA (US)

(73) Assignee: Burch Barrel, LLC, King of Prussia, PA (US)

( * ) Notice: Subject to any disclaimer, the term of this patent is extended or adjusted under 35 U.S.C. 154(b) by 1001 days.

(21) Appl. No.: 17/309,512

(22) PCT Filed: Dec. 4, 2019

(86) PCT No.: PCT/US2019/064546
§ 371 (c)(1),
(2) Date: Jun. 2, 2021

(87) PCT Pub. No.: WO2020/117986
PCT Pub. Date: Jun. 11, 2020

(65) Prior Publication Data
US 2022/0133089 A1     May 5, 2022

Related U.S. Application Data

(60) Provisional application No. 62/775,098, filed on Dec. 4, 2018.

(51) Int. Cl.
*A47J 37/07* (2006.01)
*A47J 36/10* (2006.01)
(Continued)

(52) U.S. Cl.
CPC .......... *A47J 37/0763* (2013.01); *A47J 36/10* (2013.01); *A47J 36/34* (2013.01); *A47J 37/0704* (2013.01);
(Continued)

(58) Field of Classification Search
None
See application file for complete search history.

(56) References Cited

U.S. PATENT DOCUMENTS 1,414,771 A * 5/1922 Cantleberry ............ A47J 33/00
126/30
2,185,897 A * 1/1940 Krause .................... A47J 36/08
210/244
(Continued)

FOREIGN PATENT DOCUMENTS

CA         1090669 A     12/1980
KR     200427355 Y1 *  9/2006
(Continued)

OTHER PUBLICATIONS

International Search Report issued in International Application No. PCT/US2019/064546 dated Mar. 31, 2020.

*Primary Examiner* — Jorge A Pereiro
(74) *Attorney, Agent, or Firm* — Vos-IP, LLC

(57) ABSTRACT

A container suitable for capturing fire, said container comprising an outer housing having an open top and a closed bottom, an inner fire-containing receptacle fitting within the outer housing, a grate, and means to raise or lower one of the grate or fire-containing receptacle, said container comprising a lid fashioned to engage with the open top of the outer housing, and a tripod stand capable of suspending the container and comprising a lift system engaged to said lid to operate the lid from a position engaged with the open top to a position disengaged with the open top.

8 Claims, 26 Drawing Sheets

(51) Int. Cl.
*A47J 36/34* (2006.01)
*F24B 5/06* (2006.01)
*F24B 13/02* (2006.01)

(52) U.S. Cl.
CPC ....... *A47J 37/0731* (2013.01); *A47J 37/0786* (2013.01); *F24B 5/06* (2013.01); *F24B 13/02* (2013.01); *A47J 2037/0795* (2013.01)

(56) References Cited

U.S. PATENT DOCUMENTS

| | | | | |
|---|---|---|---|---|
| 2,298,741 | A | * | 10/1942 | Lazna .................... G03B 27/56 |
| | | | | 248/125.1 |
| 2,466,496 | A | * | 4/1949 | Smith .................... A47J 33/00 |
| | | | | 126/30 |
| 4,094,295 | A | | 6/1978 | Boswell et al. |
| 4,502,464 | A | * | 3/1985 | Figueroa ................ F24B 1/024 |
| | | | | 110/251 |
| 4,532,911 | A | | 8/1985 | Orter |
| 4,732,138 | A | | 3/1988 | Vos |
| 5,025,715 | A | | 6/1991 | Sir |
| 6,314,955 | B1 | | 11/2001 | Boetcker |
| 6,868,849 | B1 | * | 3/2005 | Endres ................ A47J 37/0763 |
| | | | | 126/25 R |
| 8,739,380 | B1 | | 6/2014 | Montgomery |
| 9,109,616 | B1 | * | 8/2015 | Ballentine ............. F16B 7/1454 |
| 9,814,348 | B1 | | 11/2017 | Adams et al. |
| 2004/0000303 | A1 | | 1/2004 | Regen et al. |
| 2008/0271725 | A1 | * | 11/2008 | Parmelee ................ F24B 1/205 |
| | | | | 126/30 |
| 2012/0324682 | A1 | * | 12/2012 | Ballentine ............ F16B 7/1454 |
| | | | | 24/535 |
| 2013/0298781 | A1 | * | 11/2013 | Ganuza ............... A47J 37/0623 |
| | | | | 99/447 |
| 2015/0108140 | A1 | * | 4/2015 | Ivatorov ................. A47J 36/38 |
| | | | | 220/573.1 |
| 2018/0042616 | A1 | * | 2/2018 | Demas ............... A61B 17/1327 |

FOREIGN PATENT DOCUMENTS

| | | | |
|---|---|---|---|
| KR | 101328507 | B1 * | 11/2013 |
| KR | 20150117860 | A * | 10/2015 |
| SE | 0950605 | A1 * | 2/2011 |

* cited by examiner

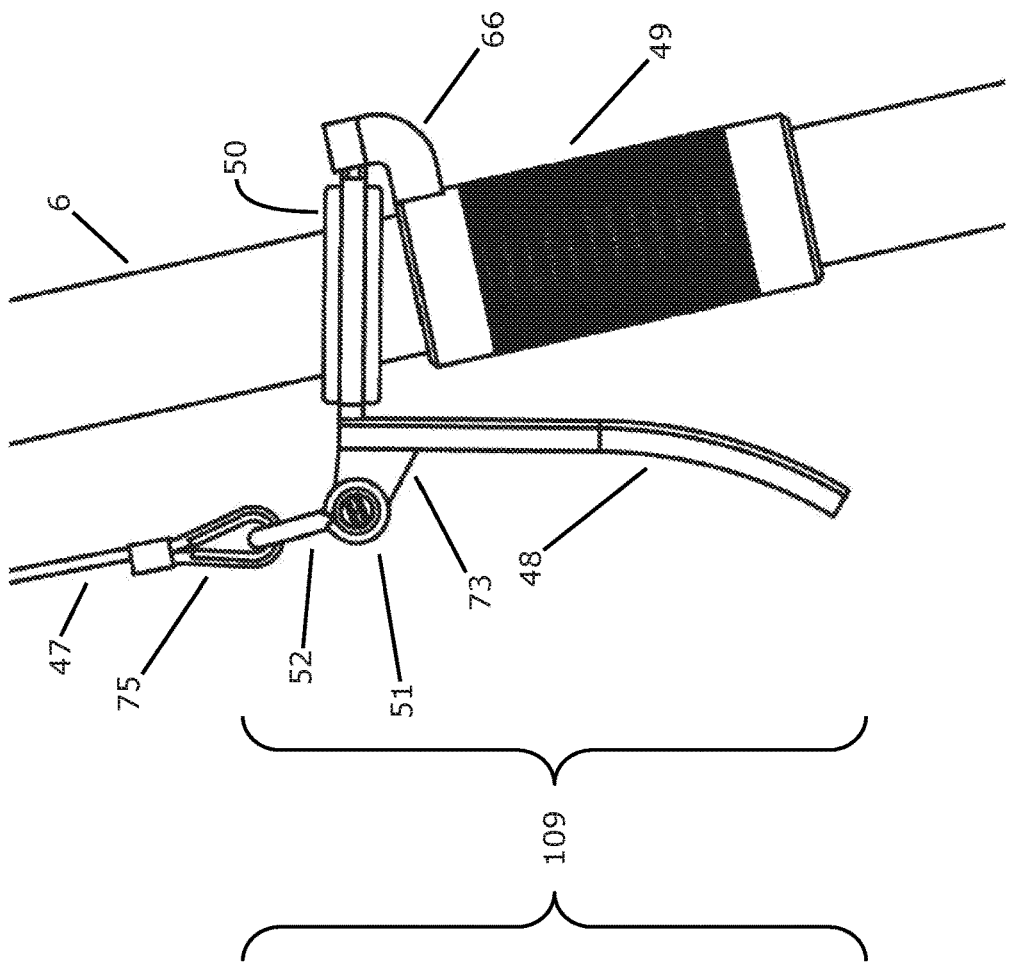
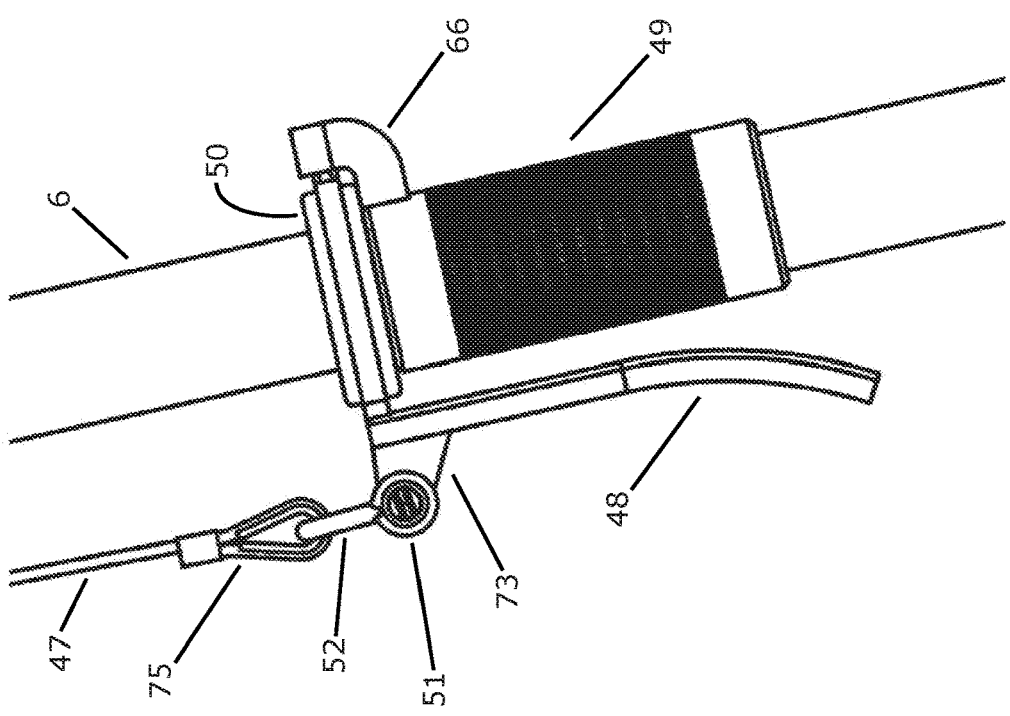

MODULAR GRILL AND BURN BARREL

CROSS-REFERENCE TO RELATED APPLICATIONS

This application is a 371 National Phase Entry of International Patent Application No. PCT/US2019/064546 filed on Dec. 4, 2019, which claims the benefit of U.S. Provisional Patent Application No. 62/775,098 filed on Dec. 4, 2018, with the United States Patent and Trademark Office, the contents of which are incorporated herein by reference in their entirety.

FIELD OF THE INVENTION

The present invention is generally related to a modular grill and burn barrel apparatus.

BACKGROUND OF THE INVENTION

Fire is the most essential of elements to allow one to control his or her own environment. Early man tamed fire to allow heating of cold locations, boiling of water—to prevent diseases—and ultimately to cook meats and vegetables for consumption. Indeed, the use of fire as a heat source for comfort, warmth, and cooking is as ancient as mankind itself.

Modernly, for purposes of cooking, fire is neatly contained within metal pans and oriented to allow the heat to radiate properly to a grate. This forms the basis for nearly every shape and style of grill or barbeque. The North American grill industry has stated that nearly 7 in 10 US adults own a grill or smoker and nearly 8 in 10 in Canada. In 2016 the market included almost 1.5 billion dollars' worth of grills and barbeques sold in the United States alone. The market continues to grow at a rapid pace, with grills focused on gas and charcoal, as well as pellets becoming a larger part of the economy.

Classically, barbeque involves the grilling of meats including: steaks, hamburgers, hot dogs, chicken, and fish, as well as the grilling of vegetables. However, barbeque now frequently includes grilling of more exotic meats as well as different orientations to allow for smoking of the meat to impart flavors or create unique presentations of meat.

Herein, a new modular device provides not just grilling access but also features to allow for a fire pit for social enjoyment around the device and other elements that enable the device as a modular barbeque.

SUMMARY OF THE INVENTION

The embodiments herein are directed toward modular barbeque elements and new and novel features on the same. In the broadest senses the embodiments are directed toward a device comprising an exterior barrel; an interior insert with a flange that is configured to be received within the barrel; a locking lid; a tripod; a pulley system for the lid; and an adjustable fire pan track system. These features are modified in several embodiments, and can be provided alone or in combination with one another in the various embodiments.

In a first embodiment, a container suitable for capturing fire, said container comprising an outer housing having an open top and a closed bottom, an inner fire-containing receptacle fitting within the outer housing, a grate, and means to raise or lower one of the grate or fire-containing receptacle, said container comprising a lid fashioned to engage with the open top of the outer housing, and comprising a stand capable of suspending the container and comprising a lift system engaged to said lid to operate the lid from a position engaged with the open top to a position disengaged with the open top.

In a further preferred embodiment, a modular hanging barrel system comprising a cylindrical-shaped barrel feature having an exterior wall, an interior wall, a top rim, a top aperture, and a closed bottom, defining a cavity (void) within the interior wall; wherein the cavity is defined to accept an insertable feature, said insertable feature having a top aperture, a bottom aperture, an exterior insert wall, an interior insert wall, and a flange positioned circumferentially around the top aperture; said flange defined to contact the top rim to maintain said insertable feature at a position within the top aperture; said cylindrical-shaped barrel feature comprising at least one hanging element, suitable to secure said cylindrical barrel feature to a support.

In a further embodiment, the modular hanging barrel system comprising a plurality of vent holes on the upper half of the exterior wall of the cylindrical barrel.

In a further embodiment, the modular hanging barrel system further comprising an adjustable fire pan.

In a further embodiment, the modular hanging barrel system wherein said insertable feature is a cooler.

In a further embodiment, the modular hanging barrel system wherein said insertable feature is a watertight container.

In a further embodiment, the modular hanging barrel system further comprising an adjustable element, said adjustable element comprising at least two pins, said at least two pins engaging with a set of stair features secured to the interior wall of the barrel, said stair feature comprising a plurality of steps positioned to accept said at least two pins, wherein adjustment of the position of said pin to a step allows for raising and lowering of said fire pan on said steps. In a preferred embodiment, the adjustable feature is a fire pan. In a further preferred embodiment, the adjustable feature is a grate.

In a further embodiment, the modular hanging barrel system further comprising a grate.

In a further embodiment, the modular hanging barrel system further comprising a lid.

In a further embodiment, the modular hanging barrel system further comprising a lifting feature, said lifting feature defining a movable line, said moveable line having a first end and a second end, said first end secured to a grip slider, and said second end connected to an attachment feature. In a preferred embodiment, the attachment feature is secured to a lid. In a further preferred embodiment, the attachment feature is secured to a hook. In a further preferred embodiment, the grip slider comprises a biasing feature wherein said biasing feature maintains the grip slider in a locked position when under a load.

In a further embodiment, the modular hanging barrel system further comprising a grate ring, said grate ring having a top and a bottom, said bottom having a diameter defined to engage with the top of the barrel; and a top having a diameter defined to engage with the bottom of a lid; within the grate ring is a receiving feature defined to receive a grate within said receiving feature. In a preferred embodiment, said grate ring comprises at least one collar lock stud, said collar lock studs define to engage within a collar lock channel in said lid.

In a further embodiment, the modular hanging barrel system wherein the exterior wall is a first layer and the interior wall is on a second layer, and a void is defined between the first layer and the second layer of said cylindrical shaped barrel feature, said void filled with an insulating material.

In a further preferred embodiment, a modular barrel system comprising an outer barrel having an outer face, an inner face, a top lip, and defining an aperture defining a cavity within the inner face; an inner insert portion, said inner insert portion comprising a flange at one end of said inner insert portion, a cylindrical side wall configured to be received within the cavity, and wherein said flange is configured for contacting said top lip; a fire pan suitable for being positioned inside of said insert portion, a grate, and a lid.

In a further embodiment, the modular hanging barrel system further comprising a tripod, said tripod engaged to the outer barrel at three points, thereby suspending said outer barrel from said tripod.

In a further embodiment, the modular hanging barrel system further comprising a movable line having a first end and a second end, said moveable line passing through the top of said tripod, said first end of said movable line secured to a grip slider, said grip slider being a selectively secured anchor, wherein said grip slider is disposed of on one leg of said tripod, said grip slider slidably engaged to said leg and suitable to raise or lower the second end of said movable line.

In a further embodiment, the modular hanging barrel system wherein said outer barrel comprises a plurality of openings aligned in a circumferential orientation on said outer barrel, and comprising a vent band aligned with said plurality of openings, said vent band having a first end and a second end, said first end being secured to the inner wall of said outer barrel, and said second end secured to a slideable vent knob; wherein said slideable vent knob slides open or closed, wherein closing said slideable vent knob compresses the vent band across the inner face of the outer barrel over the vents; wherein opening of said vent band pulls the vent band away from said wall openings thereby making the vent band noncontiguous to the wall openings, and thereby allowing for airflow into the openings.

In a further embodiment, the modular hanging barrel system wherein air flows through the plurality of openings, and between the insert and the interior wall of the outer barrel and exits out the bottom of the insert.

In a further preferred embodiment, a modular barrel system comprising an outer barrel, an inner insert, a group of staircase inserts, a fire pan, a grate, and a lid, said staircase inserts secured to an inner wall of said barrel; said fire pan comprising at least one stud extending away from an outer wall of said insert, and said at least one stud configured to engage with said staircase inserts; wherein said fire pan is adjustable by rotation, wherein rotation changes the position of the at least one stud on the staircase inserts and thereby modifying the vertical position of the fire pan within the inner insert.

In a further embodiment, a modular hanging barrel system comprising: a cylindrical-shaped barrel having an exterior wall, an interior wall, a top rim, a top aperture defining a void within the cylindrical barrel; wherein the void is defined and configured to receive a tubular insert, said insert comprising an aperture at a top end and a bottom end, a wall connecting the top and bottom, said wall having an exterior insert wall face and an interior wall face and a flange positioned circumferentially around the top of the insert; said flange defined to be retained on the top rim of the barrel and said wall being positioned within the void, said flange maintaining said insert at a position within the top aperture; and a support structure sized to support the cylindrical-shaped barrel, said support structure comprising hanging elements for hanging the cylindrical-shaped barrel.

In a further embodiment, the modular hanging barrel system comprising at least one bracket on said exterior wall, said at least one bracket connected to said hanging elements to hang said cylindrical-shaped barrel.

In a further embodiment, the modular hanging barrel system comprising a fire pan, said fire pan disposed of within said tubular insert.

In a further embodiment, the modular hanging barrel system comprising a pulley system, said pulley system comprising a wire having a first end and a second end, a grip body attached to said first end, and a connector attached to said second end; said grip body attached to said support structure and said grip body comprising a hinged locking member configured to bias said locking member into a locked position.

In a further preferred embodiment, a modular hanging barrel system comprising: a cylindrical-shaped barrel having an exterior wall, an interior wall, a top rim, a top aperture defining a void within the barrel; wherein the void is configured to receive a tubular shaped insert, said insert defining a side wall and an aperture at each of the top and bottom ends, said side wall having an exterior insert wall face, an interior insert wall face and a flange positioned circumferentially around the top end of the insert, said flange defined to contact the top rim of the barrel to maintain said insert at a position within the top aperture, and said insert comprising a series of tracks, each track comprising a series of steps; an insertable fire pan adjustably secured within the insert, and wherein the insertable fire pan comprises at least one stud extending past a side wall of said fire pan, said stud engaging with said steps; a locking lid feature capable of being selectively secured to an element of the cylindrical-shaped barrel; and a support structure sized to receive the cylindrical-shaped barrel and comprising hanging elements for hanging the cylindrical-shaped barrel.

In a further embodiment, the modular hanging barrel system further comprising a ring shaped collar, said collar having a collar top and a collar base, said collar top having a larger diameter than the collar base, and defining an aperture through said collar top and base; the collar base defining a ledge for receiving a grate.

In a further embodiment. the modular hanging barrel system further comprising a collar lock stud, said collar lock stud selectively engaging to a slot in a lid.

In a further embodiment. the modular hanging barrel system further comprising a lid pulley system, said lid pulley system comprising a wire having a first end and a second end, a grip body attached to said first end, and a connector attached to said second end; said grip body attached to said support structure and said grip body comprising a hinged locking member configured to bias said locking member into a locked position.

In a further embodiment, a modular barbeque system comprising: a tripod, an adjustable pulley system, a barrel, and an attachable lid; said tripod comprising three legs, each leg having a top and a base, each of said three legs being attached together at said top to create said tripod; said adjustable pulley system comprising a length of line having a proximal end attached to a grip slider and a distal end attached to a connecting feature, said grip slider being slidably positioned on one of said three legs, said connecting feature connecting to a lid; said lid defined and configured to engage to an open end of a barrel; said barrel comprising an exterior shell having a wall having an exterior and interior face, and a top aperture having a top lip, and a cylindrical insert comprising a top, a bottom, and a side wall, said top comprising a circumferential flange, and wherein said flange is configured and defined to be received on said top lip on said barrel.

In a further embodiment, the modular system wherein within said passage is a fire pan, said fire pan being selectively adjustable in a vertical direction within said barbeque system.

In a further embodiment, the modular system wherein said lid comprises a locking system.

In a further embodiment, the modular system wherein said locking feature locks said lid to a collar, said collar defined as a ring-shaped piece having a collar top and a collar base, with said collar base having a smaller exterior and interior diameter than said collar top, said smaller interior diameter defining a shelf for receiving a grate.

In a further embodiment. the modular system wherein said shell comprises a plurality of circumferentially aligned openings in said shell wall, and an adjustable internal expansion vent system, said vent system comprising a vent band, said vent band having a first end and a second end, said first end connected to an internal face of said shell, and said second end connected to a slideable knob, said vent band capable of being moved between an open and a closed position, with said closed position forcing said vent band against the internal face of said shell over said circumferentially aligned openings in said shell wall.

In a further embodiment. the modular system wherein said adjustable internal expansion vent system draws air through said circumferentially aligned openings, into a void between said internal shell wall and an exterior wall of said insert.

In a further embodiment, a lid and barrel suspension system comprising: a cable having a proximal end and a distal end, said proximal end attached to a grip slider; said grip slider comprising a locking member to allow said slider to be locked into a static position or to be unlocked to a movable position; said locking member biased toward a locked position when under a load.

In a further embodiment, the lid system comprising wherein said distal end is connected to a connecting latch.

In a further embodiment, the lid and barrel suspension system comprising wherein said connecting latch is connected to a lid.

In a further embodiment, the lid and barrel suspension system wherein said grip slider comprises a slider pivot, said slider pivot attached to said locking member on one side of said locking member, and an opposing side of said locking member being attached to a grip handle, wherein said grip handle is secured to the proximal end of said wire and is biased in an upward direction under a load.

In a further preferred embodiment, a barbeque lid system for locking and lifting a grate from a barbeque comprising: a barbeque, a lid, a grill grate, and a collar; said collar configured to be received on a top portion of said barbeque and comprising at least one collar lock stud for engaging said lid, said grate configured to fit within said collar, said lid comprising a top, a side, and a bottom, said bottom configured to be received on said collar; said lid comprising a locking mechanism corresponding to receive and secure said at least one collar lock stud; and said locking mechanism selectively engaging to said at least one collar lock stud whereby said collar can be selectively locked to or separated from said lid.

In a further embodiment, the lid system further comprising a collar shelf, said collar shelf defined between a collar top and a collar base, and said collar shelf supporting said grill grate.

In a further embodiment, the lid system wherein said locking mechanism comprises a collar lock channel and a collar lock slot, said collar lock stud configured to be received within the collar lock channel in an open position, and said collar lock stud configured to be received within the collar lock slot in a locked position.

In a further preferred embodiment, an adjustable fire pan track system comprising: a barbeque shell, an open ended cylindrical insert, an adjustable fire pan track, and a fire pan; said barbeque shell comprising an interior cavity, a side body wall, a base, and a top aperture; said insert having a top flange and a side wall having an interior and exterior face; a set of tracks, said tracks being secured to an interior face of said side body wall, each said track comprising a plurality of steps; said fire pan comprising at least two fire pan studs extending from said fire pan, said fire pan studs engaging with the track system and wherein each of the plurality of steps of the track system is angled to receive said fire pan studs; wherein adjustment of a position of the fire pan is performed by lifting the fire pan and turning the fire pan to the left or right to adjust a height of the fire pan up or down.

In a further embodiment, the adjustable fire pan system wherein said fire pan comprises a handle, a fire pan handle lock mechanism, said fire pan handle lock mechanism comprises a handle lock hook, a handle pivot slot, and a handle lock slot, wherein movement of said handle into a vertical position engages the fire pan handle lock hook to be received in the to handle lock slot, thereby securing the handle and fire pan in a static position.

In a further preferred embodiment, an adjustable internal vent system for a barrel comprising a barrel shell having a top end and a bottom end, and a side wall, within said side wall are a plurality of vent holes extending through the side wall and positioned in the upper half of the side wall, said plurality of holes aligned along at least a portion of a circumferential ring on said side wall; a vent band having a first end and a second end, said first end secured to said side wall, and said second end connected to a slideable knob; wherein the length of said vent band is defined to be the same as the circumference of the section of the circumferential ring being covered; wherein movement of the slideable knob from an open position to a closed position forces the vent band against the plurality of vent holes, thereby closing the vent holes; and wherein sliding the slideable knob from a closed position to an open position pulls the vent band away from the interior wall thereby opening the vent holes.

In a further embodiment, the adjustable internal vent system further comprising an interior insert, said interior insert having an open-ended cylindrical body and a top, said top comprising a flange, wherein air enters the vent holes and passes from the vent holes along the wall of the insert to the bottom of said insert, releasing at the bottom of the insert adjacent to the bottom of the barrel.

In a further preferred embodiment, a modular hanging barrel system comprising: a cylindrical-shaped barrel having an exterior wall, an interior wall, a top rim, a top aperture defining a void within the barrel; wherein the void is configured to receive a tubular shaped insert, said insert comprising a side wall and an aperture at each of a top end and a bottom end, said side wall having an exterior insert wall face, an interior insert wall face and a flange positioned circumferentially around the top end of the insert, said flange defined to contact the top rim of the barrel to maintain said insert at a position within the top aperture, and said insert comprising a series of tracks secured to the interior insert wall face, each track comprising a series of steps; an insertable fire pan adjustably secured within the insert, and wherein the insertable fire pan comprises at least one stud extending past a side wall of said fire pan, said stud engaging with said steps; a ring shaped collar, said collar having a collar top and a collar base, said collar top having a larger diameter than the collar base, and defining an aperture through said collar top and base; the collar base defining a ledge for receiving a grate, and comprising a collar stud; a locking lid feature capable of being selectively secured to said collar, said lid comprising a collar lock channel sized to receive said collar stud; a support structure sized to receive the cylindrical-shaped barrel and comprising hanging elements for hanging the cylindrical-shaped barrel, and comprising a lid pulley system, said lid pulley system comprising a wire having a first end and a second end, a grip body attached to said first end, and a connector attached to said second end; said grip body attached to said support structure and said grip body comprising a hinged locking member configured to bias said locking member into a locked position.

BRIEF DESCRIPTION OF THE FIGURES

FIGS. 10A-10B depict a grip slider element, with FIG. 10A depicting an open (sliding) position and FIG. 10B depicting a locked or normally biased under a load position.

DETAILED DESCRIPTION OF THE INVENTION

The embodiments herein describe a barbeque or grill (used interchangeably) that is modular to transition from a cooking device with a grate, to a device having an open flame. In certain embodiments, the grill device is positioned with a stand, preferably a tripod, which allows for the grill feature to be positioned between three legs of a tripod and to be suspended at a particular height suitable to the user.

Allowing the barrel to be suspended from a tripod provides for several key features that make this device unique. First, with regard to radiation of heat, the suspended barrel portion can radiate heat around the barrel, without losing heat to the ground. Through suspension, the barrel also creates a barrier, to some extent, wherein the tripod suspending the barrel will not be hot, and provides protection toward the hot barrel, while still radiating heat. Furthermore, the tripod allows for one to move the barrel or components held within the barrel in a vertical manner. Thus, for example, the barrel being positioned in a static position, the tripod, using a pulley system engaged through the top of the tripod to engage with a claw (hook) to hold meat and be suspended within the barrel, or to secure to a cooking grate. This allows one to raise or lower food to adjust cooking temperatures or styles of cooking. Furthermore, we can attach the lid to the tripod and engage the lid up and down as necessary, without reaching over the hot flames, for example to add fuel to the fire, to cook above the flames, or cook lower to the flames.

Figure 1:
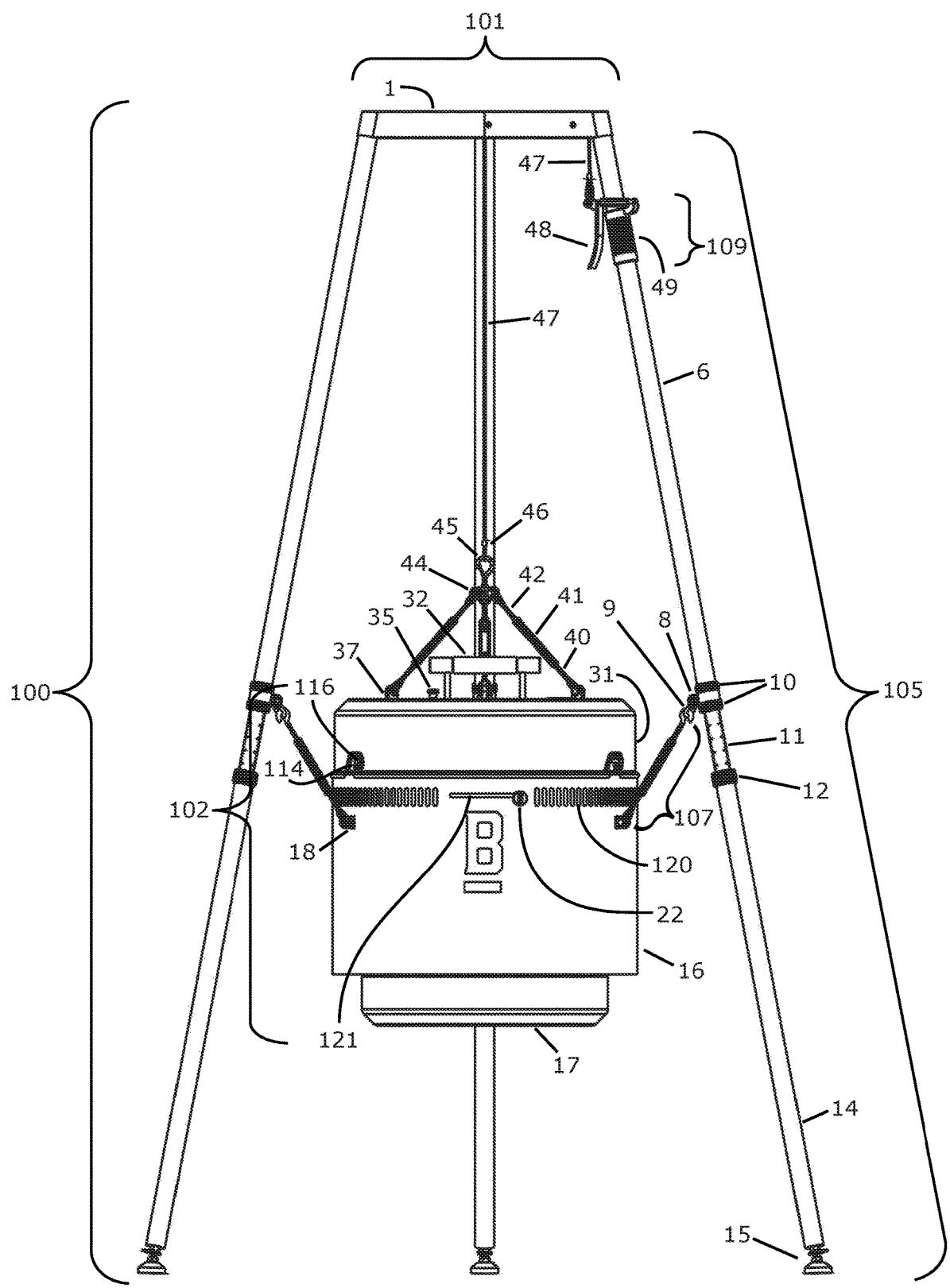
FIG. 1 depicts a front view of a barrel system with a tripod.

Accordingly, FIG. 1 depicts an embodiment of the barrel system (100) as attached to a tripod (101). The barrel system (100) comprises a tripod (101) and a barrel (102). The tripod consists of three tripod legs (105), each leg comprising leg components to allow for adjustment of the length of each leg. Various embodiments and orientations are suitable for making such a leg. FIG. 1 depicts one such embodiment, wherein the leg comprises the leg top (6), a mounting collar (8), a leg middle collar lock (10), a leg middle extension (11), a leg middle twist lock (12), a leg bottom (14), and a foot (15). The leg middle components allow for the adjustment of the length of the leg. Thus, if the surface for use is uneven, the legs may be different lengths and allow the tripod to sit level, with some variance in the level of the ground. The leg middle extension (11) allows for expansion or contraction of the leg length, and when the length is appropriate, the leg middle twist lock (12) can be rotated to secure the leg into place at the particular length desired.

On the leg in FIG. 1 is a grip slider (109) system comprising a grip lever (48) and a grip handle (49). The grip slider is slidably attached to the tripod leg (105), and the grip handle (49) and grip lever (48) allow the user to lock or unlock the grip slider (109) to raise or lower the wire (47). The wire (47) comprises a first end attached to the grip slider (109) and a second end connected to a wire hook (46), with the wire running through the tripod top (1). By pulling on the grip slider (109), the wire can be pulled down to raise the second end or to lower the second end.

In FIG. 1 the wire hook (46) is attached to an eye bolt (45), which is connected to a turnbuckle bracket (44), which is then in turn connected to a series of turnbuckles comprising a turnbuckle hook end (40) connected to a lid clevis bracket (37), a turnbuckle middle (41), and a turnbuckle clevis end (42). This allows the turnbuckles to be adjusted for length for attachment to the lid (31). In other embodiments the turnbuckle components can be replaced with any other attachment means, including wire harnesses, chains, and other adjustable or fixed length components for connecting the wire (47) to a harness for connection to the lid (31).

The lid (31), in FIG. 1, further comprises a lid handle (32). The lid (31) comprises a top and sides, and an open bottom. The open bottom being sized in circumference to slightly larger than the underlying grill or a collar element, whereby the open bottom of the lid (31) may be secured around either the underlying top end of the grill or the collar element. In FIG. 1, there are depicted a collar lock channel (114) allowing a collar lock stud (115) to connect to the lid for selectively attachable connection.

FIG. 1 further details a barrel (102) comprising an outer shell (103) and a shell bracket (18) which connects a turnbuckle (107) to a mounting ring (9), which allows the barrel (102) to be connected to the tripod leg (105), specifically at the mounting collar (8). The specific length of the attachment can be modified or adjusted by means known to those of ordinary skill in the art, but FIG. 1 details use of a turnbuckle (107) for said adjustment.

The barrel (102) comprises an outer shell (103), having a shell side (16) and a shell bottom (17), with the shell bottom (17) having a reduced diameter as compared to the shell side (16). On shell side (16) of the barrel are a plurality of vent slots (120), which are arranged near the top of the shell side (16), and the vent slots (120) are circumferentially placed in a linear manner around a portion of the barrel. The vent slots (120) are preferably placed on 1-95% of the circumference, meaning that the openings comprise a total of 1-95% of the total length of the circumference. The spacing of the vent slots (120) may be continuously placed, either irregularly or equidistantly, or oriented in two or more separate groupings of openings, with the purpose of the vent slots (120) to allow air to be pulled from outside of the outer shell (103) and to be passed through the vent slots (120) into the air void (71) created inside of the inner face of the exterior shell of the barrel and then released under an insert and into the central void of the barrel. Accordingly, the amount of air entering the fire should be controllable, and a vent knob (22) controls a vent band to adjust the air flow through the device.

Figure 2A:
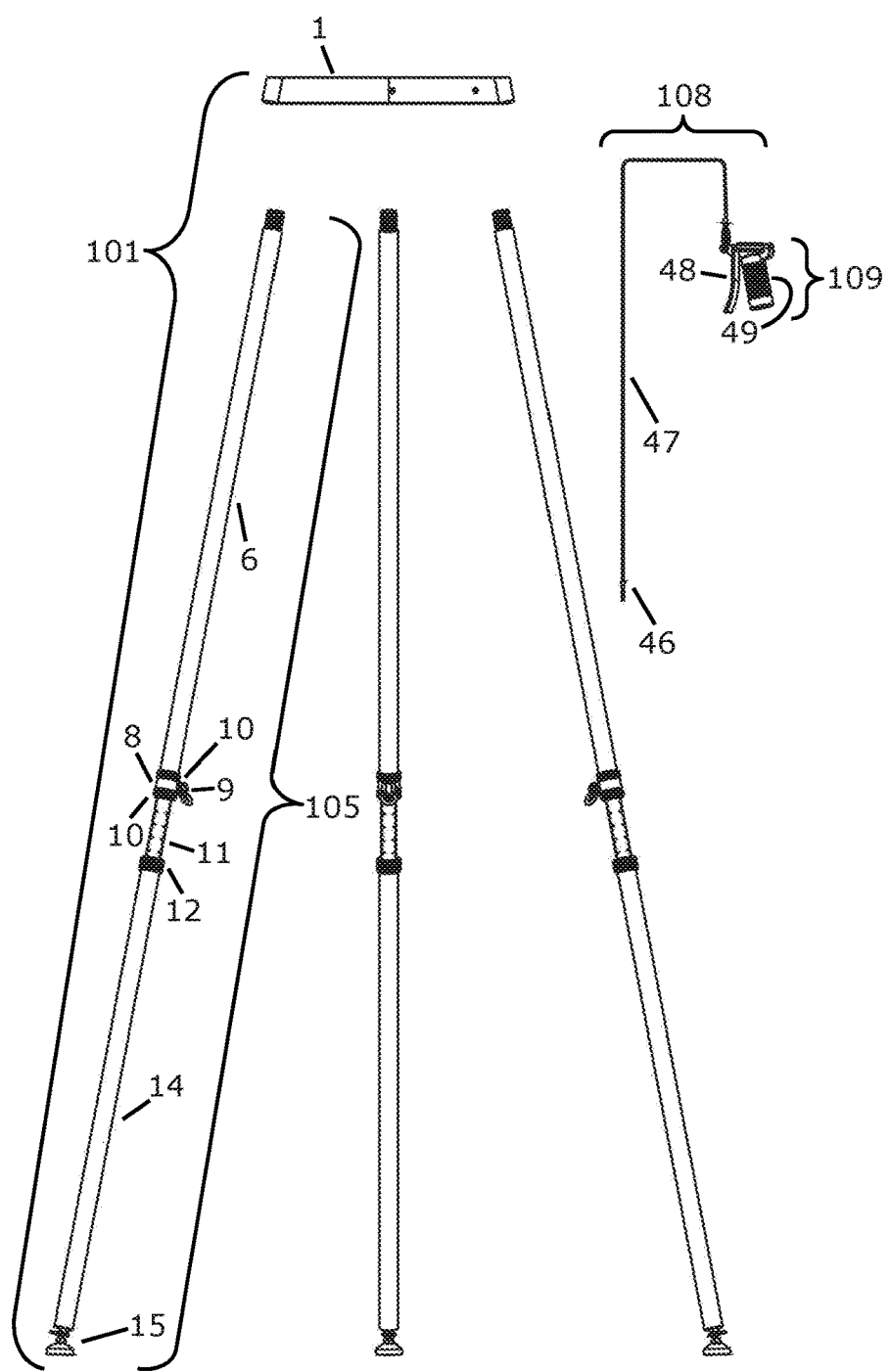
FIGS. 2A-2D depict exploded views of the features of FIG. 1, with FIG. 2A detailing a tripod component and FIG. 2B detailing a barrel component, FIG. 2C further exploding the tripod component, and FIG. 2D depicting further details of the barrel components.
Figure 2B:
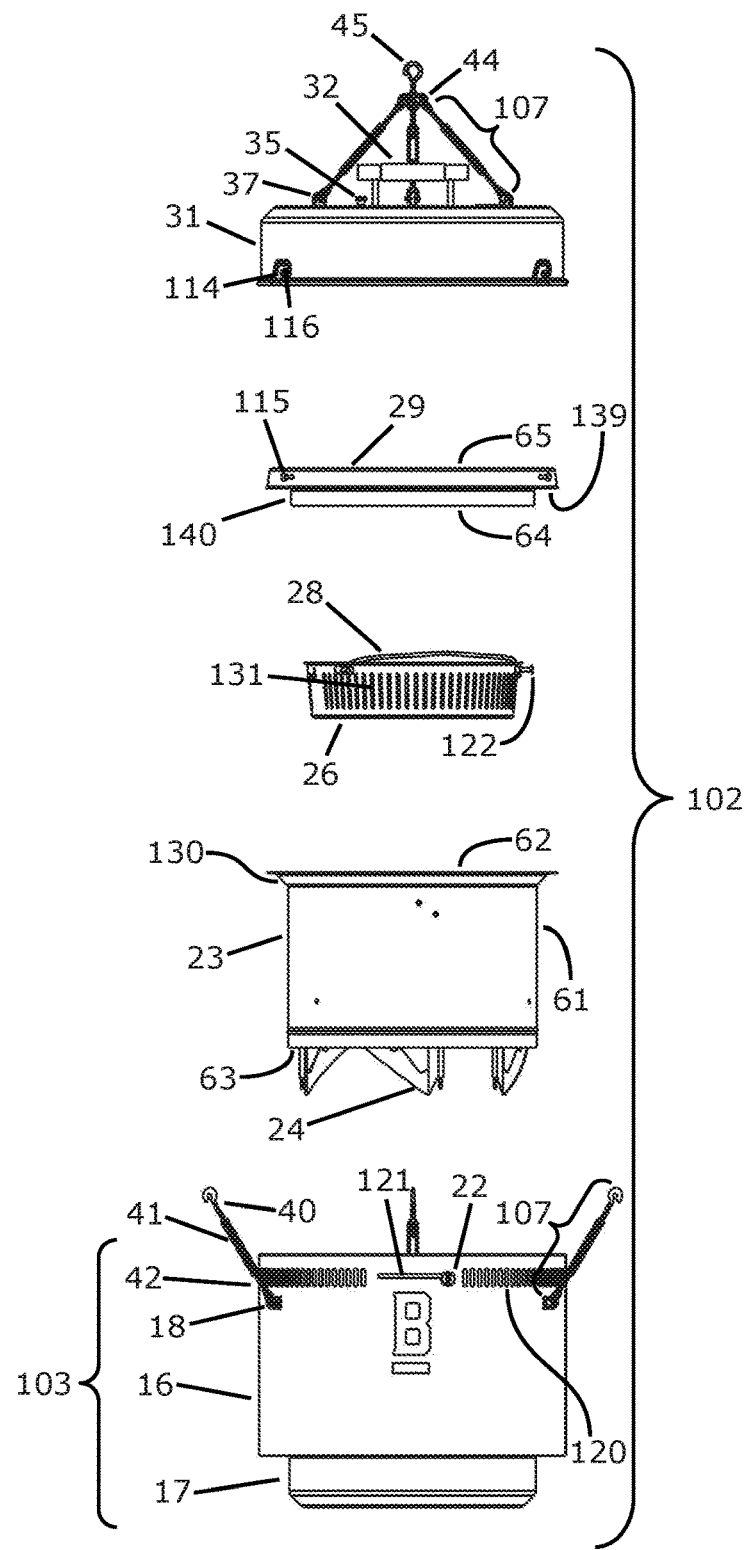
Figure 2C:
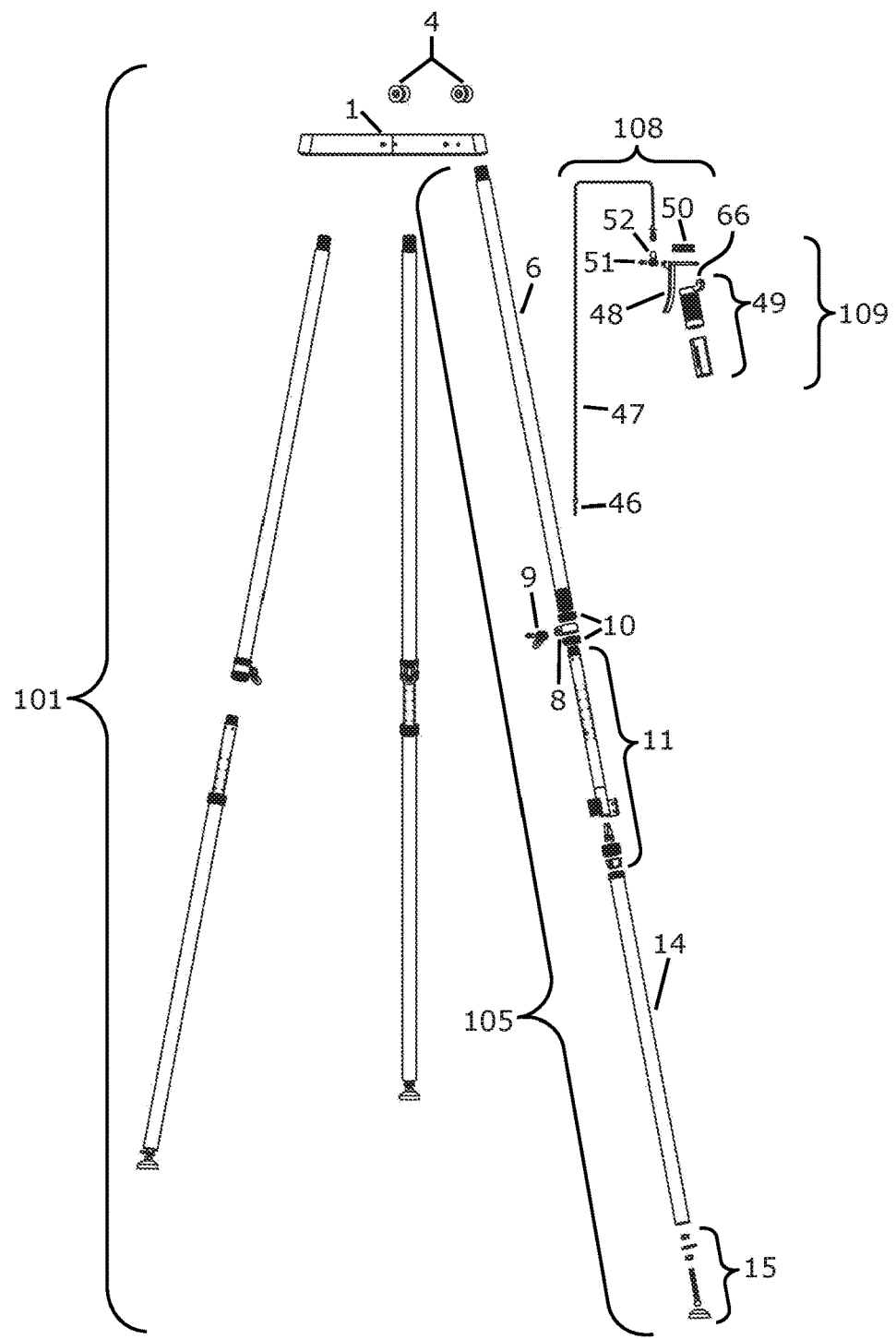
Figure 2D:
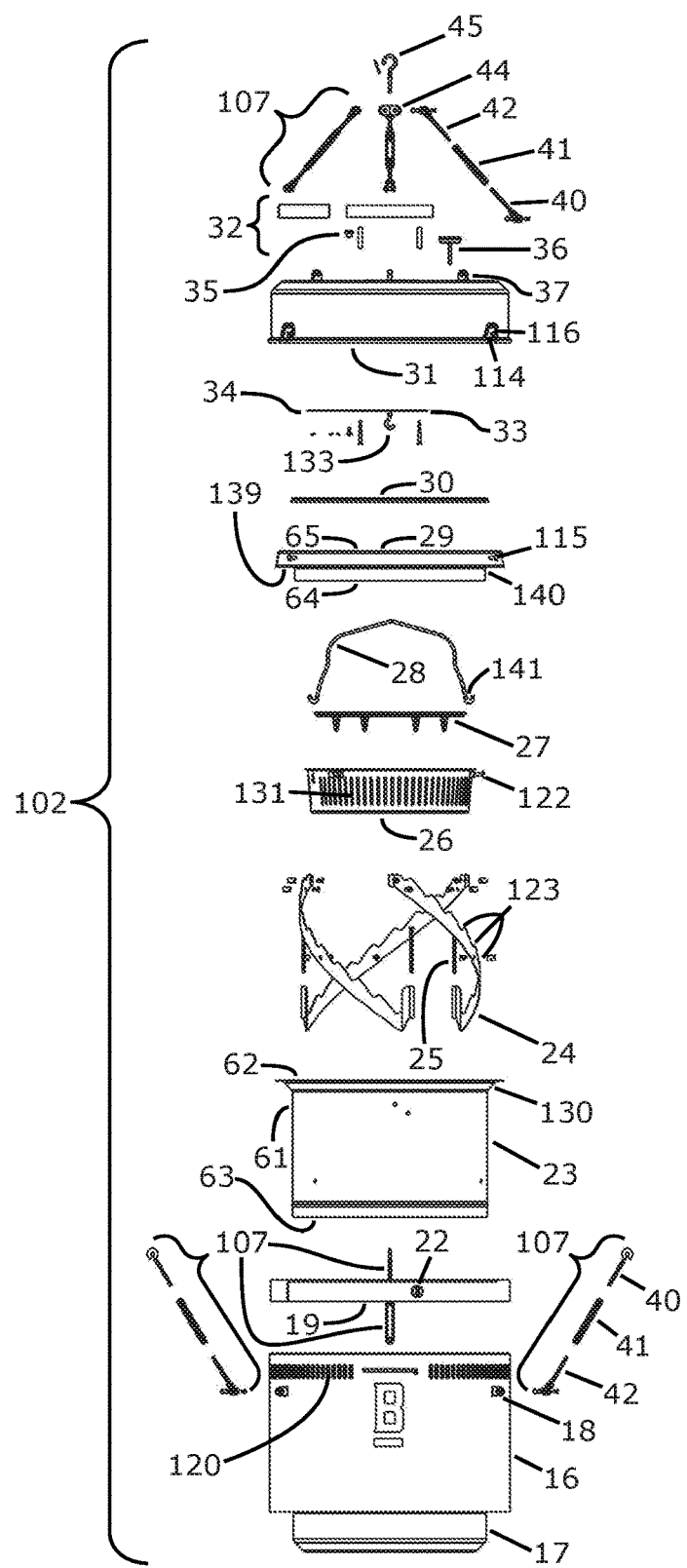

FIGS. 2A, 2B, 2C, and 2D provide further detail of an embodiment of the disclosure. Specifically, FIGS. 2A and 2B depict partial exploded views and FIGS. 2C and 2D provide further exploded views of certain additional components in order to better show the detail of the specific embodiment of the barrel and tripod system.

FIG. 2A details the tripod (101), with the tripod top (1), connected to three tripod legs (105), the leg top (6), mounting collar (8), the mounting ring (9), the leg middle collar lock (10), leg middle extension (11), leg middle twist lock (12), the leg bottom (14), and feet (15). The feet (15) are connected via adjustable means, for example a ball and socket or other rotatable element so that the feet (15) can be adjusted to allow the foot to sit flat, even while the tripod leg (105) itself is at an angle. The legs, as described herein, allow for individual and specific modification of length, to allow for optimal setup when the ground is uneven, or to allow the tripod itself to be shorter or taller as desired by a user. The tripod top (1) comprises a series of pulley wheels (4), which are engaged with the pulley system (108).

The pulley system (108) comprises the grip slider (109), with the grip lever (48) and the grip handle (49), the wire (47), and the wire hook (46) disposed at the distal (second) end of the wire (47), while the proximal (first) end of the wire (47) is attached to the grip lever (48). As described in greater detail, these features allow for a simple and efficient mechanism to raise or lower the distal end of the wire, include any components attached thereto, while biasing the grip slider (109) into a normally locked position to maintain position when under a load. This biasing nature prevents the grip slider (109) from releasing and dropping the distal end without warning.

The barrel (102), as depicted in FIG. 2B, comprises the outer shell (103), having a shell bottom (17) and shell sides (16). The barrel itself can be attached to the tripod (101) by connection with a turnbuckle (107). The turnbuckle is adjustable, e.g., with the turnbuckle hook end (40), the turnbuckle clevis end (42) and is attached to the outer shell (103) with a shell bracket (18). The turnbuckle middle (41) is adjustable to allow for shortening or lengthening of the connection, which may be necessary when the tripod is positioned with legs having different lengths than one another. The vent component of the barrel comprises a vent knob track (121) with a vent knob (22), to allow for selective opening and closing of the vents.

The barrel insert (23) is a cylindrical shaped feature having an aperture at each of the top (62) and bottom (63) ends defining a passage therethrough. The barrel insert comprises a top lip (130) positioned along the circumference of the insert top (62). The insert side walls (61) are solid walls and connect the insert top (62) to the insert bottom (63). The barrel insert (23) is configured to be received within the outer shell (103), and therefore the insert top lip (130) is a flange defined to catch the top of the barrel itself. Thus the barrel insert (23) is received within the barrel cavity and the top lip (130) serves as a flange to maintain the insert position on the barrel.

In combination with the barrel (102), the barrel insert (23) functions to allow passage of air through the vent slots (120) and into the void of the barrel. Air passes through the vent slots (120), then hits the insert side wall (61), and because the insert top lip (130) is positioned above to reduce or prevent air flow in a vertical direction, the air is pushed down the insert side wall (61), and under the insert bottom (63), and thus brings clean, oxygenated air to the bottom of the barrel, providing necessary oxygen. Thus when the vents are open air flows to allow for a hot fire to burn and reduce smoke formation, and when the vents are closed the fire is choked. This can be used advantageously for several applications. For a burning fire, air and oxygen are desired to allow for the flames to grow and combust. When the fire needs to be smoldered or heat maintained, the amount of air may be reduced or eliminated entirely. Furthermore, because of the construction of the barrel, application of the lid, and closing of the vents, it is possible to burn wood and then shut off the oxygen supply to create charcoal. This is a unique opportunity to create hardwood lump charcoal from user selected sources. In certain embodiments, the insert may be utilized for nonfire purposes, wherein the insert is an insulated sleeve, such that it can function as a cooler or retain water.

To optimize burning within the barrel (102), a further fire pan (26) is positioned within the passage of the barrel insert (23), said fire pan (26) having a plurality of slots (131) in the side wall of the fire pan, and a solid bottom, to allow passage of gasses to the material being combusted within the fire pan (26). The fire pan (26) comprises a handle (28), which is used to optionally adjust the position of the fire pan (26) as well as to lock the fire pan into position. The tracks (24) and the insert mounting bolt (25) define a particular feature, wherein the tracks are a series of stepped inserts, secured to the interior face of the barrel. These features (as shown in greater detail in FIG. 2D) allow for adjustable positioning of the fire pan (26) within the barrel, by securing the fire pan stud (122) to a step, which can then be generally adjusted up or down to modify the distance between the fire pan and the grate for cooking. Lifting of the handle unlocks the fire pan (26), while placing it on a side releases a lock to allow for secured placement.

Above the fire pan (26) sits a collar (29) having a collar bottom (64) and a collar top (65). The collar bottom (64), comprises a smaller diameter than the collar top (65), and has a collar base side wall (140), which, is configured to be received within the insert top (62) aperture. Thus, the dimensions are such that the collar bottom (64) fits within the aperture and the collar top (65) is of a larger diameter so that it sits on the insert flange (top lip) (130). The collar (29) further comprises a collar lock stud (115), which is configured to be received within the collar lock slots (116) on the lid (31).

The lid (31) is cylindrically shaped, with an open bottom and a closed top. The lid (31) comprises lid sides, a lid top, and a lid bottom, with the lid bottom defining an aperture, so that the aperture fits over and around the collar top (65), allowing the collar lock studs (115) to engage with and lock to the collar lock slot (116). The lid further comprises a lid handle (32), the lid clevis bracket (37), the lid vent knob (35), the turnbuckles (107), the turnbuckle bracket (44) and the eye bolt (45).

FIG. 2C further details the leg assembly in a further exploded view. The leg components having previously been described are shown to allow the leg middle extension (11) to fit within each of the ends of the leg top (6) and leg bottom (14), each having an opening sized and defined to accept the leg middle extension within one end of the leg top (6) and the leg bottom (14). A leg middle twist lock (12) allows appropriate extension and securing of the leg once the proper length is reached.

FIG. 2C further details pulley wheels (4) within the tripod top (1). These pulley wheels (4) serve as guides for the wire (47) as it is strung through the tripod top (1). The pulley system (108) comprises the wire (47) having a distal end (second end) attached to the wire hook (46), and the proximal end or first end attached to the clevis (52), which is then attached to the components of the grip slider (109). The grip slider (109) comprises a grip lever (48) which is attached at a slider pivot (66), to a grip handle (49), a Teflon spacer (lock) (50), and a short set screw (51), which attaches the clevis (52) to the grip lever (48). The proximal end of the wire (47), when attached and a load is placed on the wire (47), biases the grip lever (48) into a normally locked position, by forcing pressure against the Teflon spacer (lock) (50). This feature is further described in detail in FIGS. 10A and 10B.

FIG. 2D details further components of the barrel (102), with the shell side (16) the shell bottom (17), the shell bracket (18), which connects to the turnbuckle clevis end (42) which is connected to a turnbuckle (107), the turnbuckle (107) further comprising a turnbuckle middle (41) and a turnbuckle hook end (40). These components then secure to the mounting ring (9) on the leg, in order to secure and suspend the barrel from the tripod.

FIG. 2D also depicts the vent band (19), which is secured to the interior face of the barrel, with a vent knob (22) attached near one end of the vent band (19), with the opposing end of the vent band (19) secured to the interior face of the barrel. The vent band (19) is sized and positioned to cover the vent slots (120) when the vent band (19) is in a closed position. However, when the vent band (19) is pulled away from the interior wall of the barrel, the vent band (19) is noncontiguous with the interior wall, thus providing airflow to the vent slots (120). The vent insert (23), as previously described, has an exterior face (70) and an interior face (69), with a flange or top lip (130) at the top of the insert. Attached to the interior face (69) is a set of tracks (24) which are each secured via insert mounting bolt(s) (25). Each of the tracks (24) comprises a series of fire pan adjustment steps (123). The fire pan adjustment steps (123) allow for step-wise adjustment of the height of the fire pan (26), as the fire pan (26) is held in place inside of the insert (23) on at least one fire pan stud (122). The fire pan (26) comprises a handle (28). A fire pan insert (27) is optionally provided, which allows for charcoal or other combustible fuel to be raised off of the bottom of the fire pan (26). This is useful as after the combustible fuel is burned, the ashes fall into the fire pan (26), and thus allow the fire to continue to breathe. The handle comprises a handle lock hook (141) to secure the fire pan to the fire pan adjustment steps (123), thus providing a secure connection, as desired.

The collar (29) is a washer-like device, having a larger diameter top and a smaller diameter bottom. The collar (29) is positioned above the fire pan (26), and the collar top (65) and collar bottom (64) are defined to create a collar shelf (139), which is created by the collar bottom (64) extending into the opening of the washer-like device, and thus within the opening a grate (30) is configured to be received and sit on the shelf created by the collar top (65) and collar bottom (64) portions of the collar (29). The grate (30) is held in this position to create stability to the cooking surface, but to also allow for movement of the cooking surface, as desired by a user.

Movement of the grate (30) is performed by a novel lid (31) and suspension system. The lid (31) comprises a top, sides, and a bottom, said bottom having an opening to receive the collar top (65). The lid (31) comprises a collar lock channel (114) and a collar lock slot (116) to receive the collar lock stud (115), which secures the lid (31) to the collar (29). Other methods of connection are possible in other embodiments, with the purpose of defining a mechanism to receive the collar within the lid (31), secure them together in a selective manner, and then allow the collar (29) and the lid (31) to be removed together. This is particularly advantageous as the grate (30) is held by the collar (29). When food is cooking and the barbeque needs additional heat source, the grate (30) and any food being cooked therein can be raised to allow for access of additional fuel. Furthermore, the grate (30) can simply be lifted with the lid (31) and the lid (31) creates a heat envelope above the flame, allowing a different style of cooking wherein heat is applied from a further distance over the open flame, and the lid creates the heat envelope to aid in cooking. The user can then vent the lid (31) as necessary to modify the heat within the heat envelope.

The lid (31) comprises a handle (32), which can be fastened with any number of fastening devices. FIG. 2D further includes a lid handle plate (33) to aid in securing the components together and attached thereto is an optional lid hook (133). The lid hook (133) can be utilized to hang a wire, chain, or other accessory so that meat or materials can be suspended, either above the flamer or within the insert, instead of sitting on the grate. This provides a unique way in which the user can then use heat to cook. The lid (31) further comprises an opening for a thermometer (36), allowing a user to assess the temperature within the cooking space, and additional lid components including the lid clevis bracket (37), the turnbuckle bracket (44), and the turnbuckle (107) as described above to allow for connection to the wire (47).

Accordingly, in certain embodiments the barbeque apparatus comprises the barrel portion, a tripod portion, a lifting element, and an attachable lid. Said tripod comprising three legs, each leg having a top and a base, each of said three legs being attached together at said top to create said tripod; said lifting element (pulley system) comprising a length of line attached to a grip slider (109), said grip slider (109) being slidably positioned on one of said three tripod legs (105), with a proximal end of said length of line (wire) (47) attached to said grip slider, and a distal end of said length of line engaging to a connecting feature, for example the wire hook (46); said connecting feature (wire hook or loop) (46) connecting to a lid (31) via several turnbuckles (107); said lid (31) defined and configured to engage to an aperture of a barrel, with the lid having a larger diameter than the diameter of the barrel; said barrel comprising a shell side (16), an outer shell interior face (68), a top aperture and a closed shell bottom (17), said top aperture defining a void; an insert comprising a top and a bottom, and a side wall, said top comprising a circumferential flange, said insert defined and configured to be received within the void and wherein said flange is configured and defined to be received on the top lip on said barrel.

Figure 3:
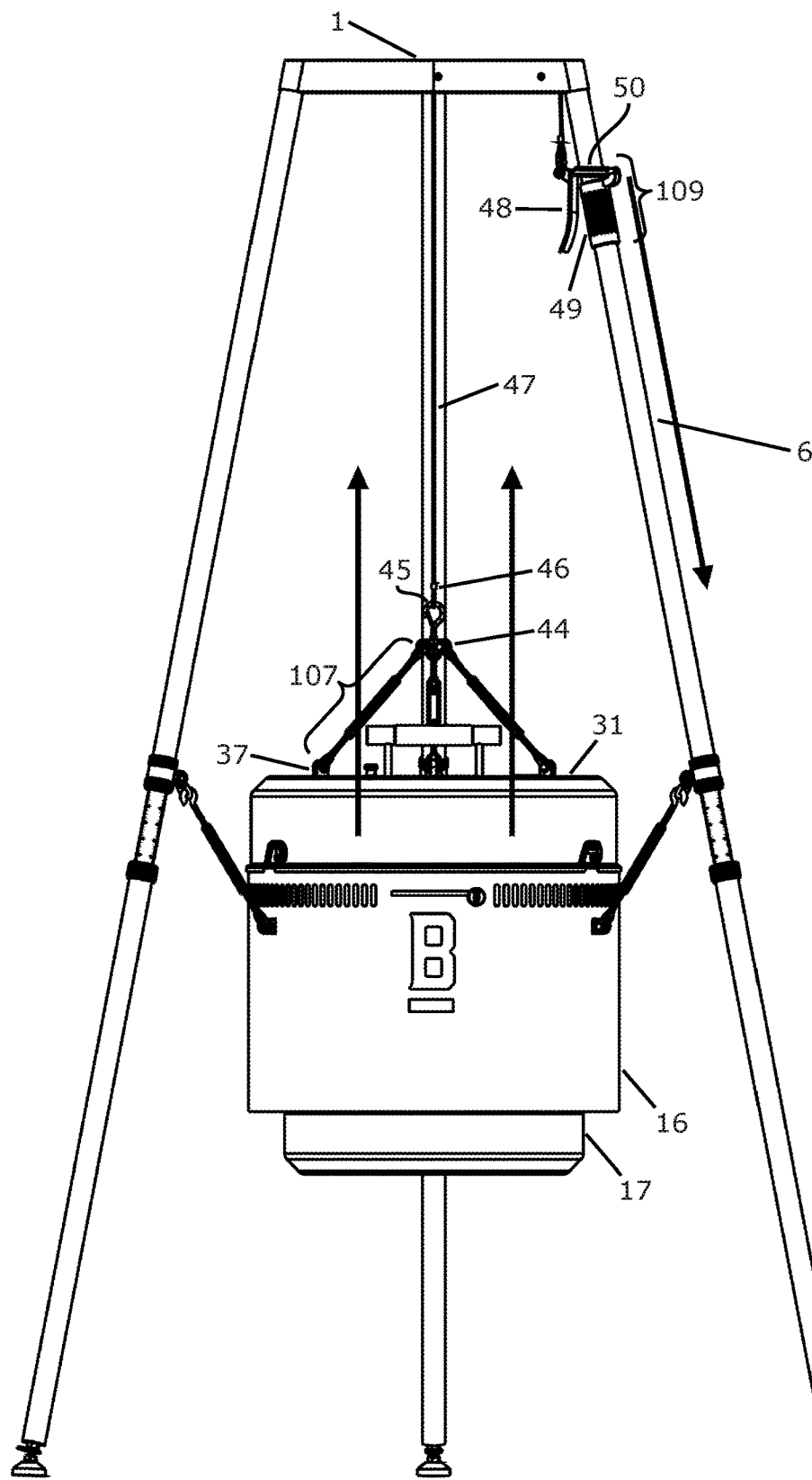
FIG. 3 details movement of the grip slider to lift the lid of a barrel, with the lid in the down position.

The barrel is then suspended from the tripod, which allows the barrel to be positioned at a comfortable cooking height, wholly set by the user. Thus, a user may want a higher or lower cooking height. Alternatively, the barrel can be used simply for aesthetics or warmth as a burn barrel to contain fire. Thus, the height may be a compromise between cooking height and aesthetic height for the ambiance. The height of the barrel can be modified with the turnbuckles and by the length of the tripod legs (105). In operation, the lid can be raised, as depicted by the arrows in FIG. 3. By pulling on the grip slider (109), the wire (47) is pulled down the tripod leg (105), and the proximal end of the wire goes down the leg while the distal end of the wire (47), which is attached to the lid (31), rises to the top of the tripod.

Figure 4:
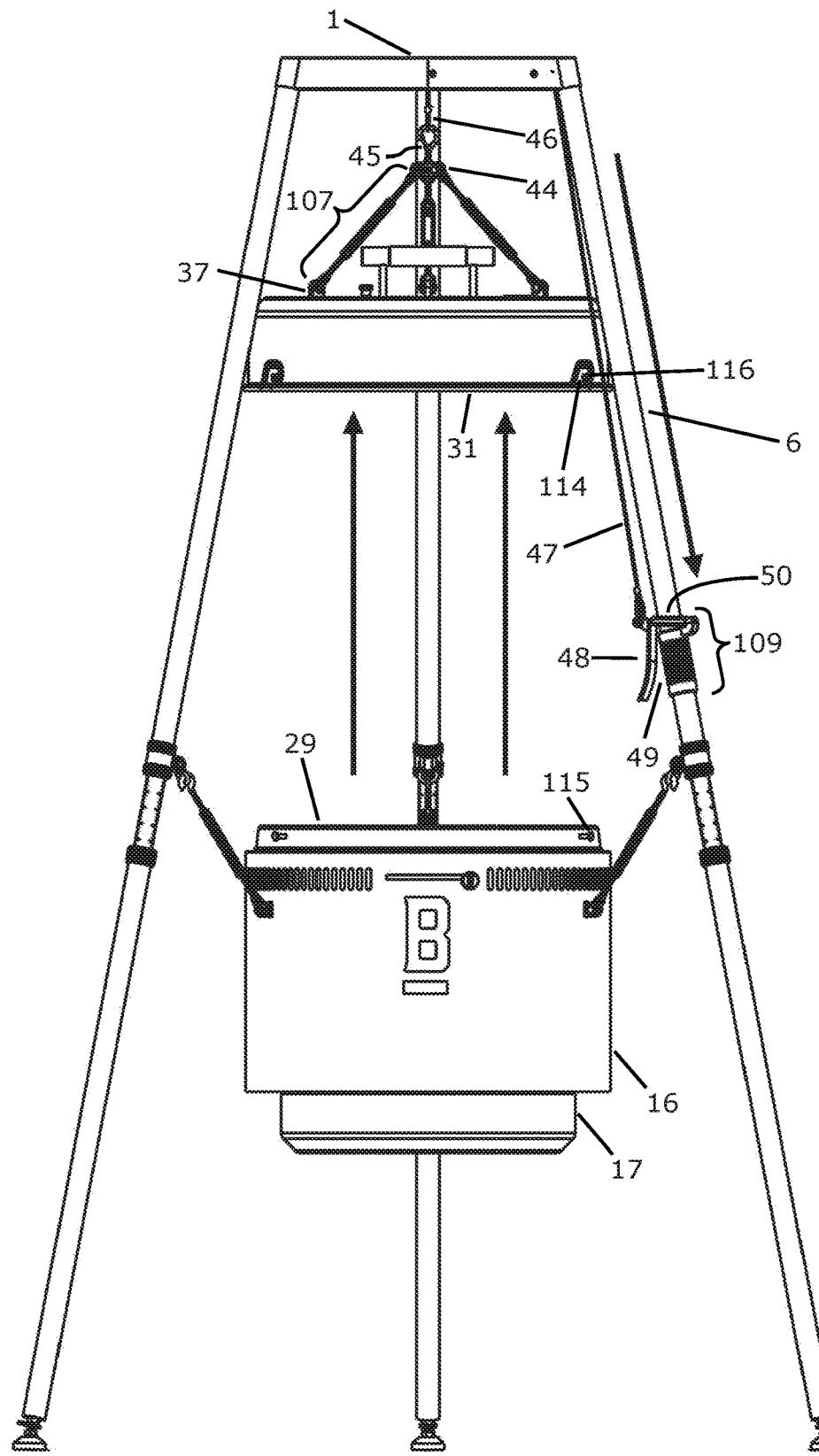
FIG. 4 depicts a movement of the grip slider and lid system, with the lid in the raised position.
Figure 5:
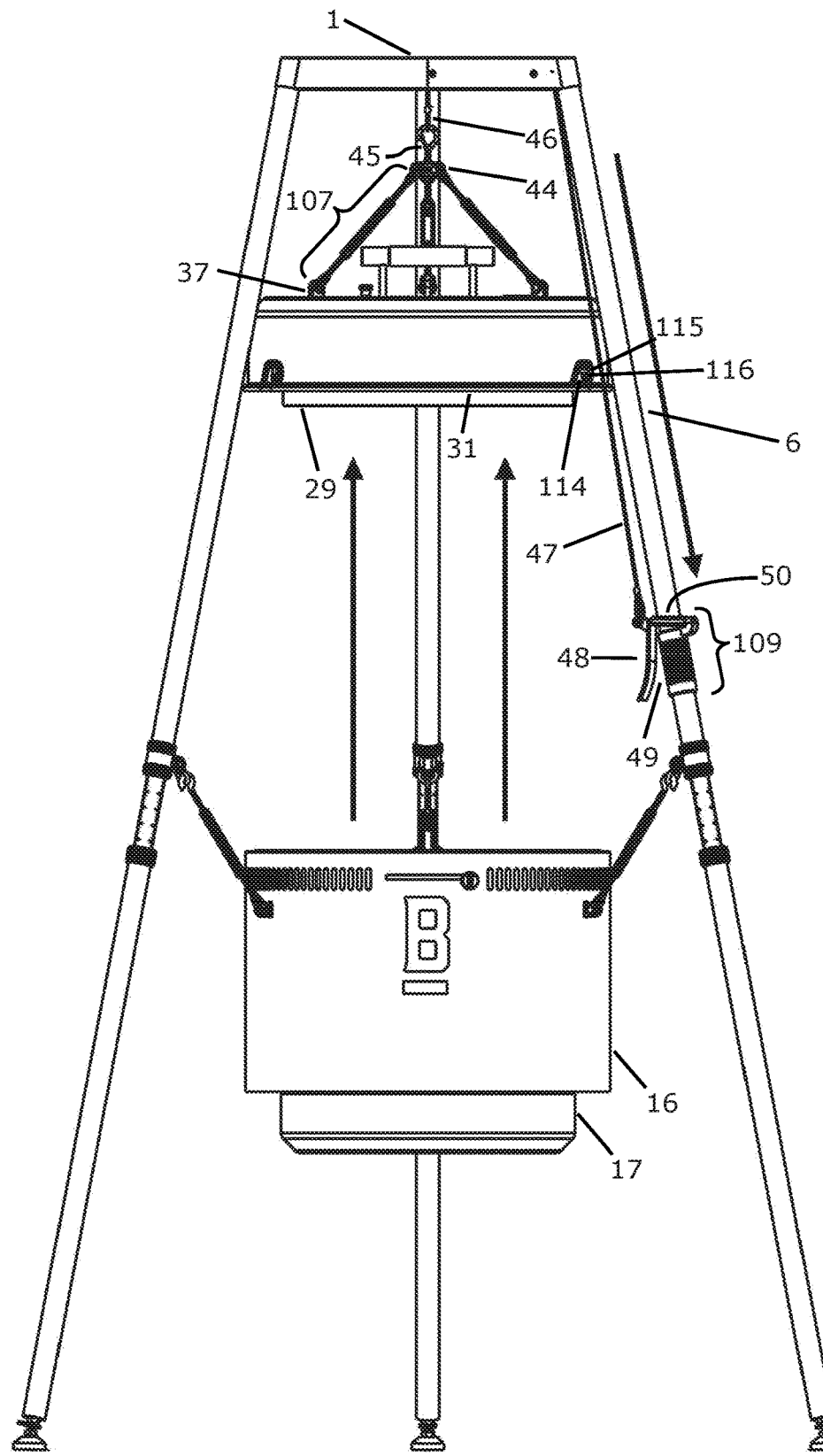
FIG. 5 depicts the lid system in the raised position, with the collar attached to the lid.
Figures 6A, 6B:
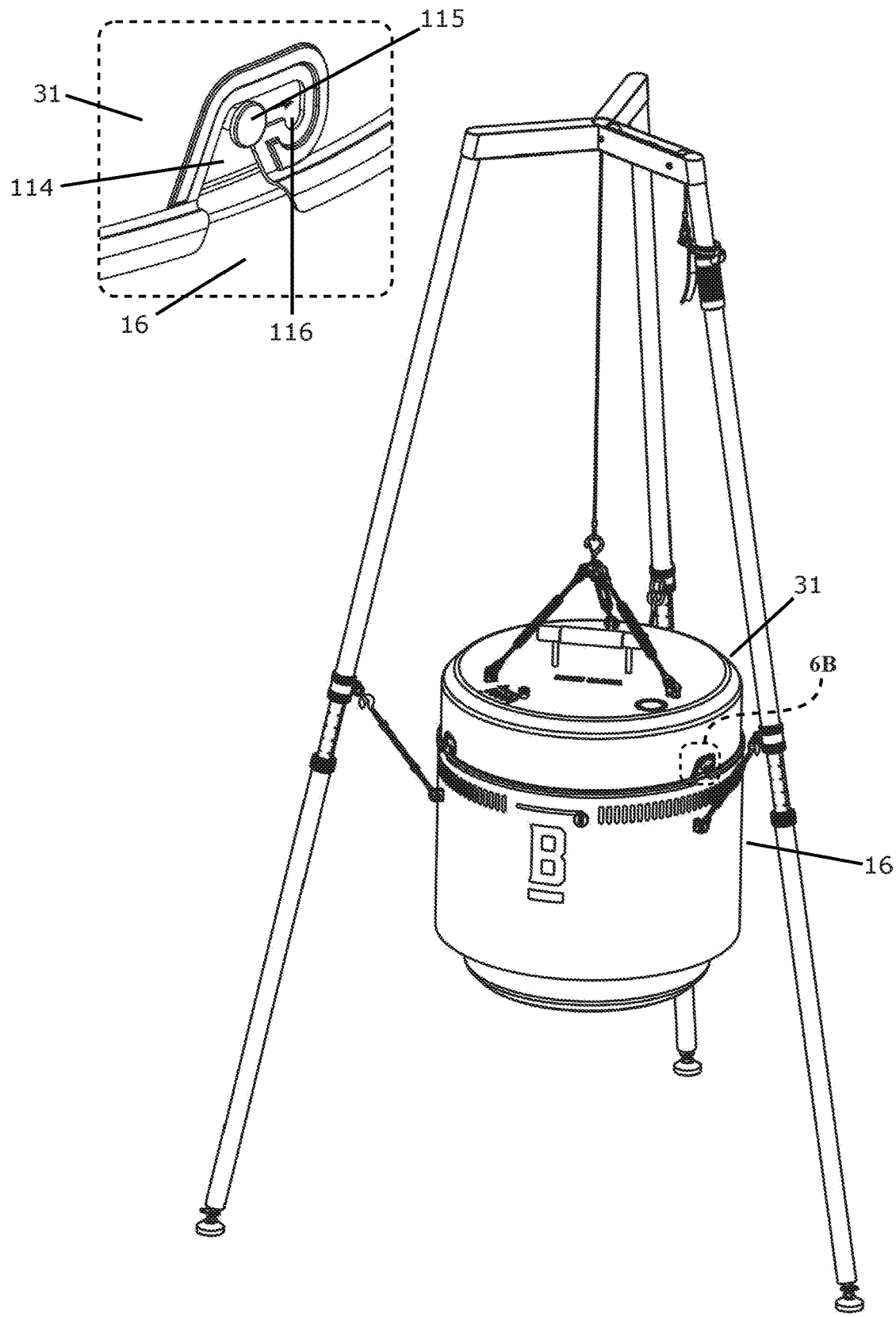
FIGS. 6A and 6B depict details of the collar lock system of the lid, with FIG. 6A detailing the barrel with the tripod, and FIG. 6B showing particular detail of the collar lock, slot, and channel in an open position
Figures 7A, 7B:
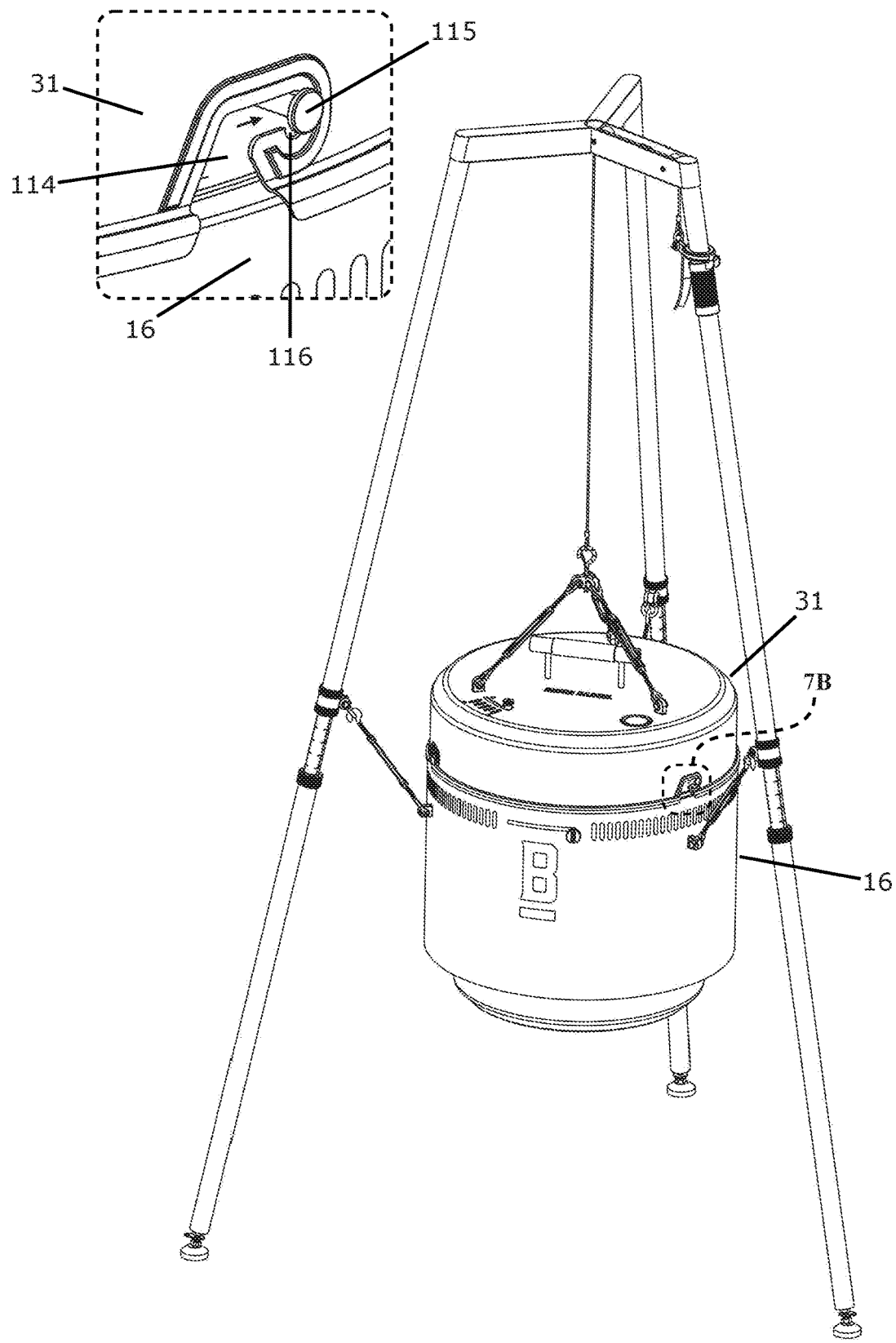
FIGS. 7A and 7B depict a locked position, with FIG. 7A depicting the components on the tripod and FIG. 7B showing further detail of the locked position.
Figures 8A, 8B:
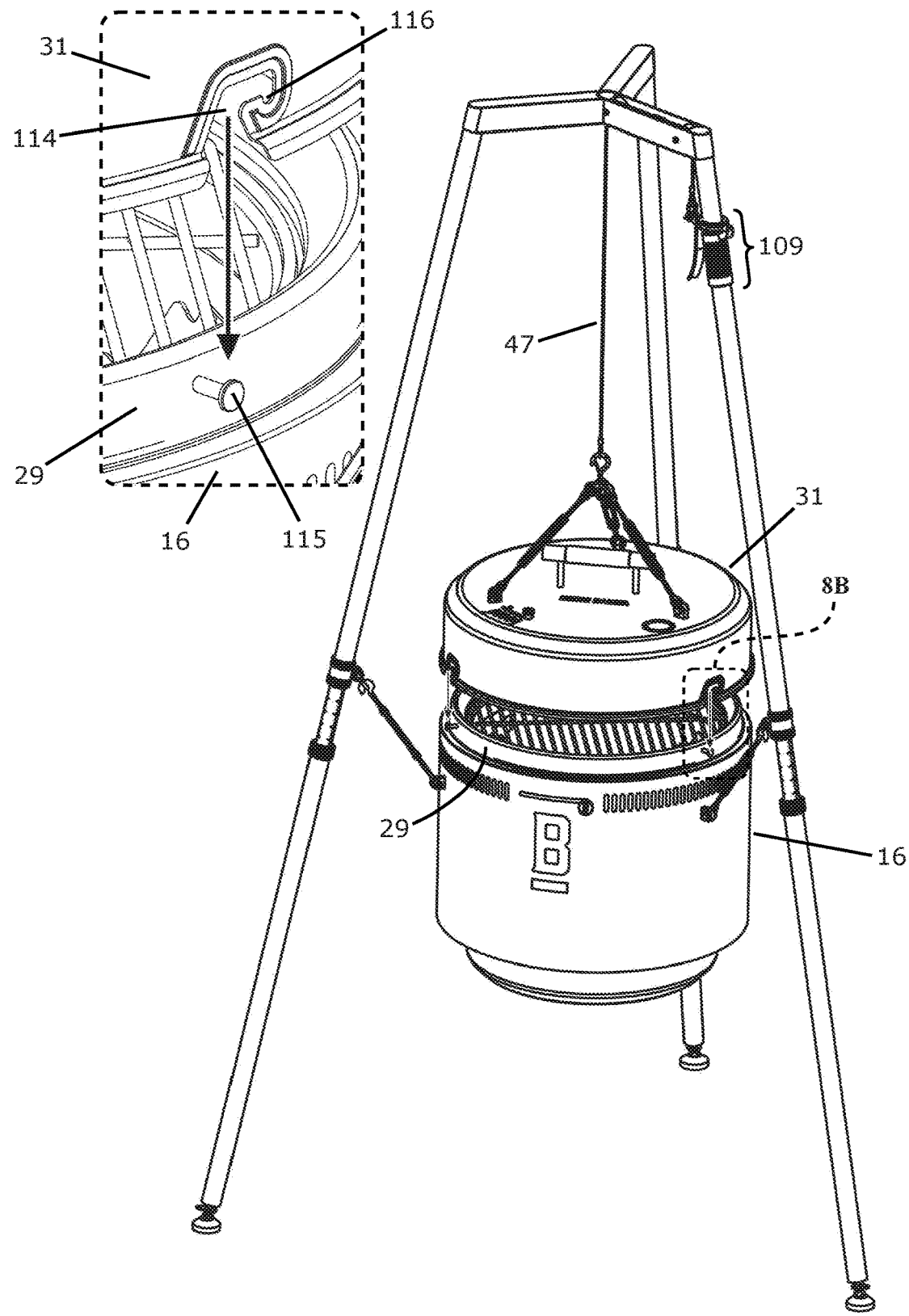
FIGS. 8A and 8B depict lifting of the lid, with FIG. 8A depicting the lid raised with the pulley system and FIG. 8B showing detail of the same.
Figures 9A, 9B:
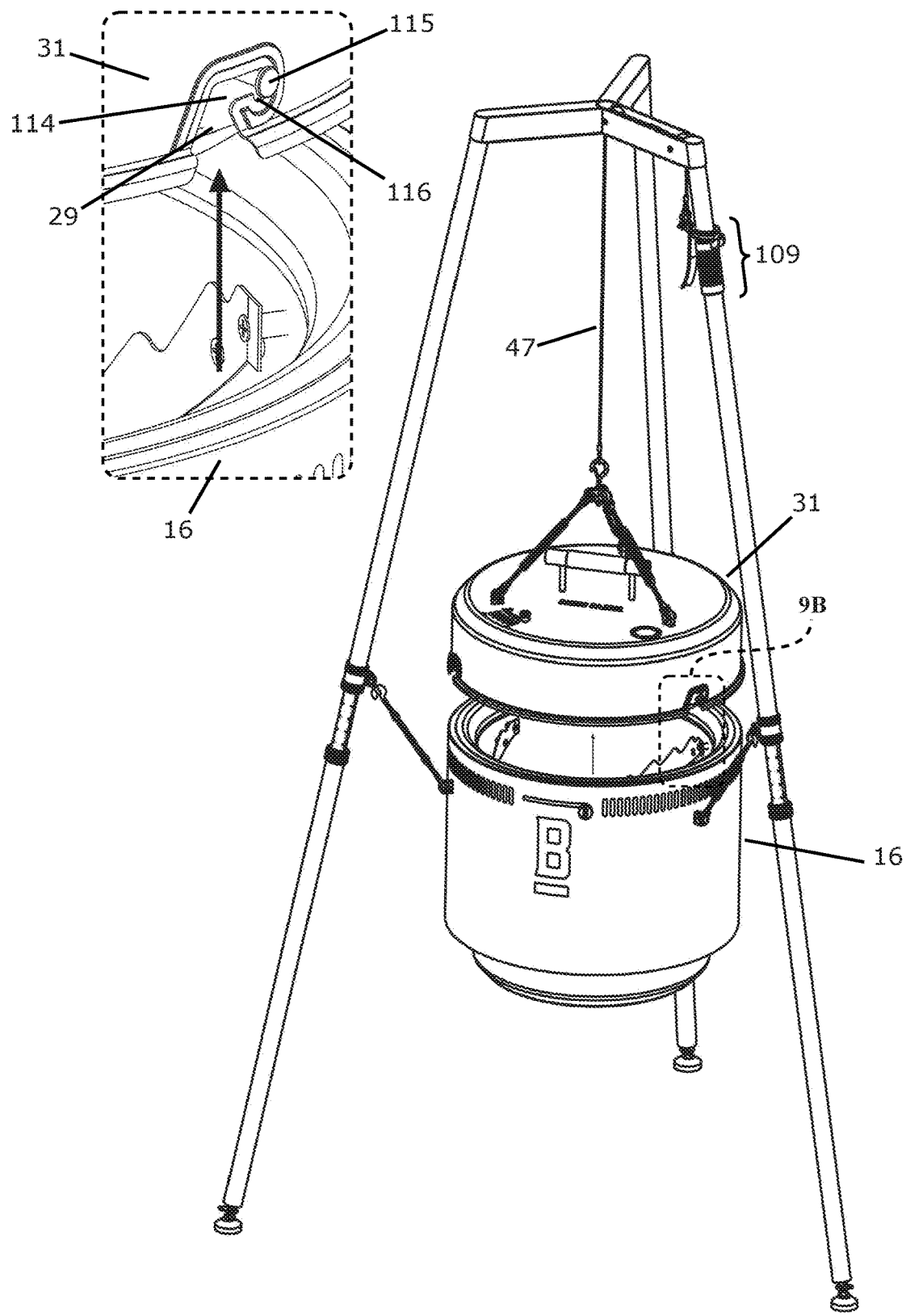
FIGS. 9A and 9B depict raising of the lid and collar from the grill with the collar channel locked to the lid, with FIG. 9A depicting the system on the tripod and FIG. 9B depicting a detailed view of a single locking element.

Because of the lid system, the lid can be raised alone, or it can be secured to the collar, through the use of the collar lock channel (114), the collar lock slot (116), and the collar lock studs (115). This allows for selective raising of the lid alone or the lid with the collar. FIG. 4 depicts the lid (31) being lifted alone, showing that the collar lock stud (115) on the collar (29) is not engaged to the collar lock slot (116). Conversely, FIG. 5 depicts wherein the collar (29) is engaged to the lid (31), and thus the collar lock stud (115) is engaged into the collar lock slot (116), thus lifting both the lid (31) and the collar (29). FIGS. 6A and 6B show a detail of the unlocked position, with FIG. 6B depicting the detail of the collar lock stud (115) within the collar lock channel (114), but not locked into place within the collar lock slot (116). Thus, in such position, the lid (31) would rise as in FIG. 4 and lift the lid (31) alone and not the collar (29). Conversely, in FIGS. 7A and 7B, the collar lock stud (115) is depicted in a locked position within the collar lock slot (116), and thus the lid (31) and the collar (29) would be lifted together. The particular orientation of the collar lock stud (115) engaging into the collar lock channel (114) is shown in greater detail in FIGS. 8A and 8B, showing the detached lid and collar, and FIGS. 9A and 9B showing an attached or secured lid and collar (29).

FIGS. 10A and 10B depict details of the grip slider (109), with FIG. 10A depicting an unlocked position and FIG. 10B depicting a locked position. When the wire (47) is under a load, the grip slider (109) is configured to bias into a locked position. The weight on the wire (47), hangs from the tripod top, and thus the weight pulls down, pulling up on the wire (47) as connected to the grip lever (48). This pulling-up action angles the grip lever (48) and the connected lock (50). The grip lever (48) is attached to the lock (50) at a right angle, with the grip lever (48) and the lock (50) creating a L-shaped feature, with the proximal end (75) of the grip lever (48) having a mounting hole (73) on one side and the lock (50) adjacently mounted at a right angle on the other side, and the distal end of the grip lever (48) being angled away from the right angle. The grip handle (49) possesses a slider pivot (66) at one end, where the slider pivot (66) connects to the opposing side of the lock (50). In certain embodiments, the lock (50) is preferably a rubber-like spacer, having a coefficient of friction sufficient to maintain the position of the feature against the metal or plastic leg of the tripod. In certain embodiments, the lock (50) advantageously secures in a recess in the leg to secure the lock. These features create a lever system that is biased to a position when under a load, and by squeezing the grip handle (48) the locked bias position is moved to an unlocked position to allow for sliding up or down the leg top (6).

The lock (50) can be replaced with another locking element as known to those of ordinary skill in the art, such that friction and the force applied creates a locking mechanism biased in a locked position under a force. To release or unlock the grip slider (109), the handle is compressed as in FIG. 10A, which eliminates the compression of the lock (50) against the leg top (6), and thus allows the grip slider (109) to freely move up or down (within its movable window), which correspondingly raises or lowers the distal end of the wire (47).

Figure 11:
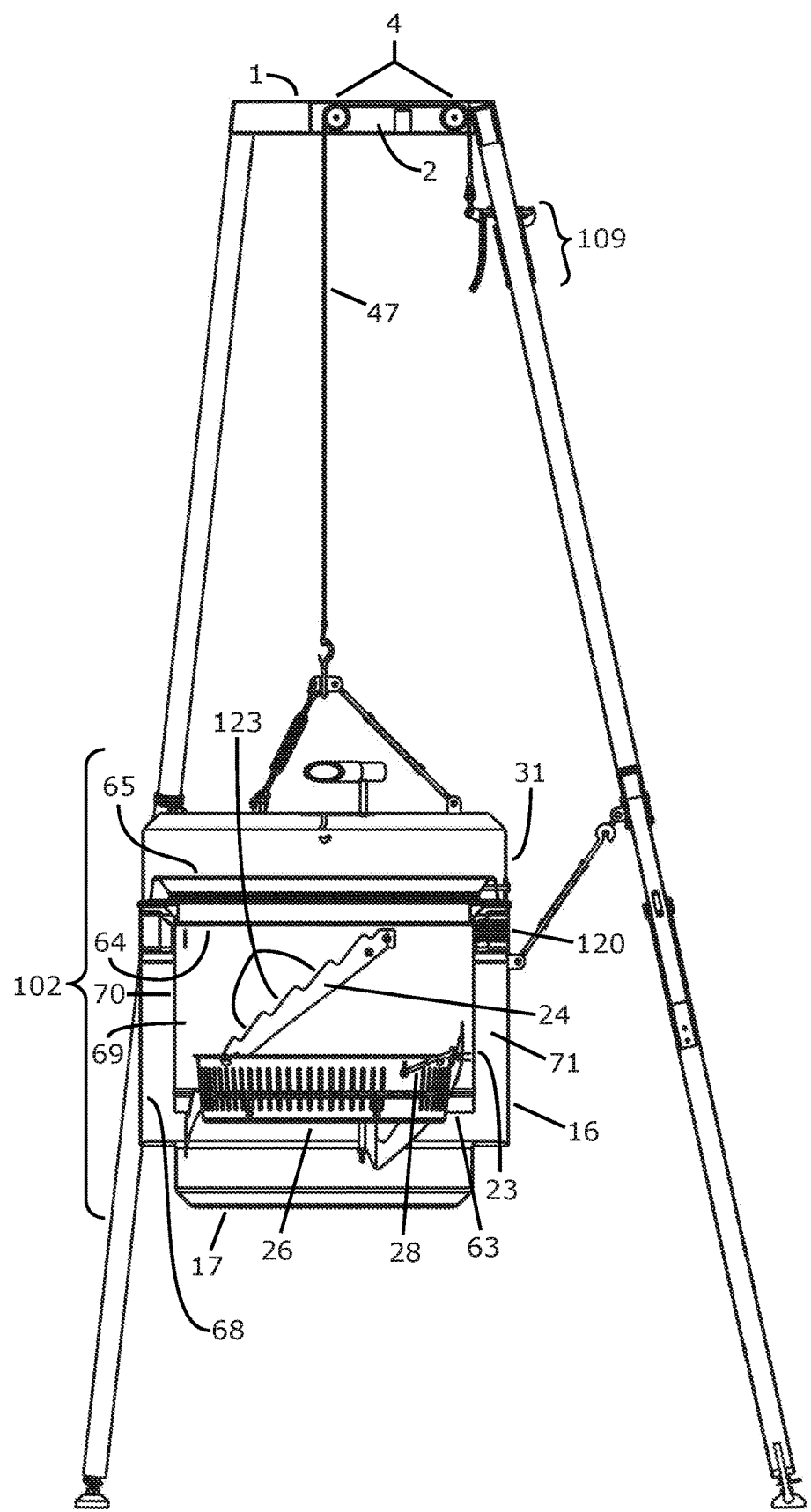
FIG. 11 depicts a cross-sectional view of a barrel system and tripod.

FIG. 11 details a cross-sectional view of an embodiment of a tripod and barrel. Beginning at the top of the figure, the wire (47) moves through the tripod top (1) via pulley wheels (4), which are held in a tripod sled (2). The pulley wheels (4) assist with ensuring that the wire (47) moves smoothly and does not bind when under a load.

Moving to the barrel (102) section, depicted are the tracks (24) as attached to the insert interior face (69). The tracks comprise a series of fire pan adjustment steps (123). There is a set of tracks (24), typically two or more, wherein each of the fire pan adjustment steps (123) provides for a ledge and recess portion (each step being a ledge and recess portion itself) to allow for a pin to rest on said fire pan adjustment step (123). As the steps are aligned, rotation of the fire pan (26) moves the pin to a lower or higher step (to be raised, the fire pan (26) would need to be lifted and placed on the higher step), and thus raises or lowers the fire pan (26) itself. This allows for the fire or heat source to move within the barrel to a higher or lower point. A handle (28) can be accessed to assist with the movement of the fire pan (26).

The cross-sectional view also shows how air flows and vents into the fire pan through the vent slots (120) into the air void (71), which is defined between the outer shell interior face (68) and the insert exterior face (70), with the air passing under the insert bottom (63) and air then having access to the fire pan (26). This allows for oxygenated air to be drawn into the fire and combust. This process increases the cleanliness of the burn, thereby reducing smoke formation, which is a major irritant for those sitting around a fire.

FIG. 11 also shows how the lid (31) nests around the collar top (65), and how the collar (29) nests inside of the insert (23), and the insert (23) rests on the top edge of the barrel itself. Accordingly, as in the exploded views of FIGS. 2A-2D, the cross-sectional view in FIG. 11 clarifies how these components engage together.

Figure 12:
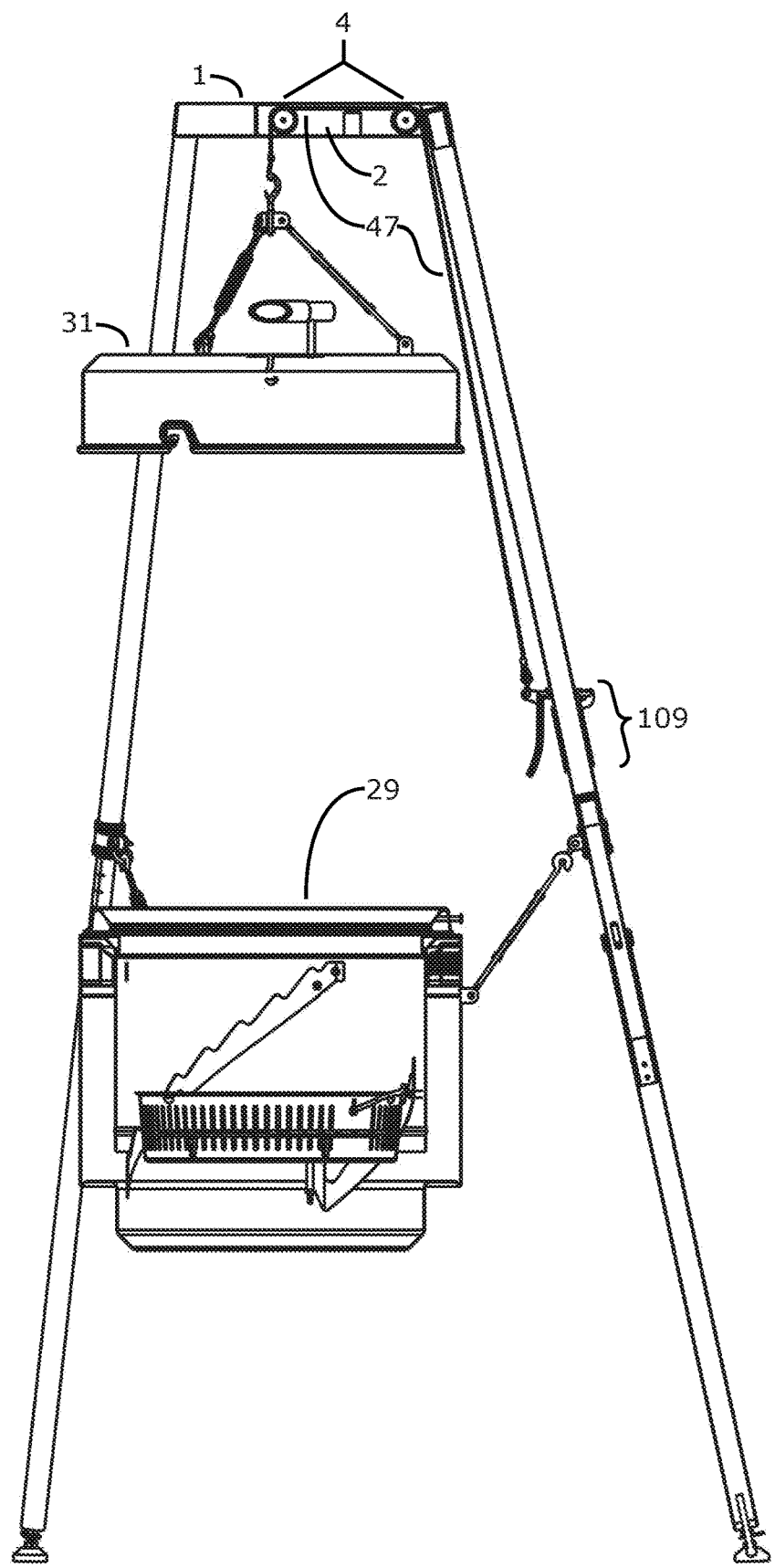
FIG. 12 depicts a further cross-sectional view of a barrel system and tripod with the lid in a raised position.

FIG. 12 depicts an embodiment in cross-sectional view wherein the lid (31) is positioned in an elevated position, but the collar (29) remains on the grill.

Figure 13A:
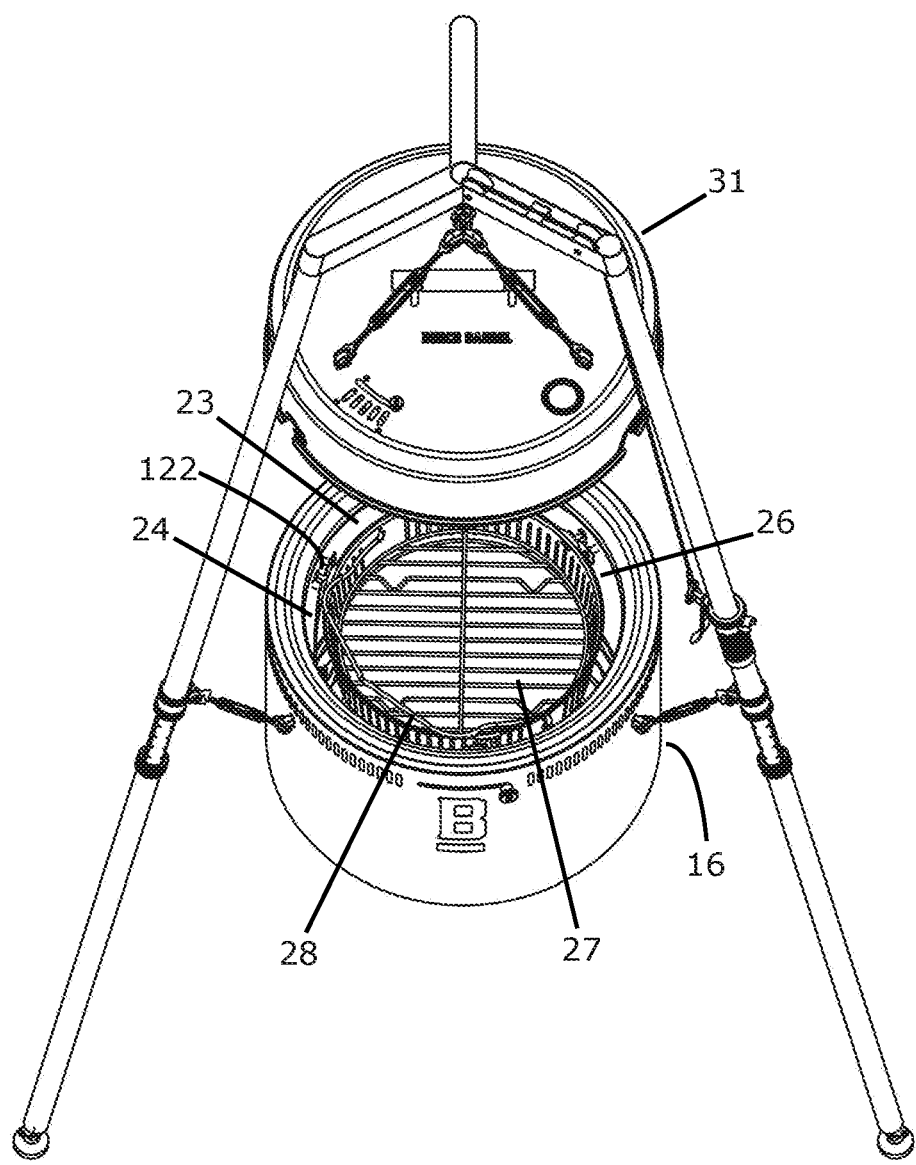
FIGS. 13A and 13B depict top views of a tripod and barrel, with FIG. 13A depicting a raised lid and a raised fire pan and FIG. 13B depicting a lowered fire pan.
Figure 13B:
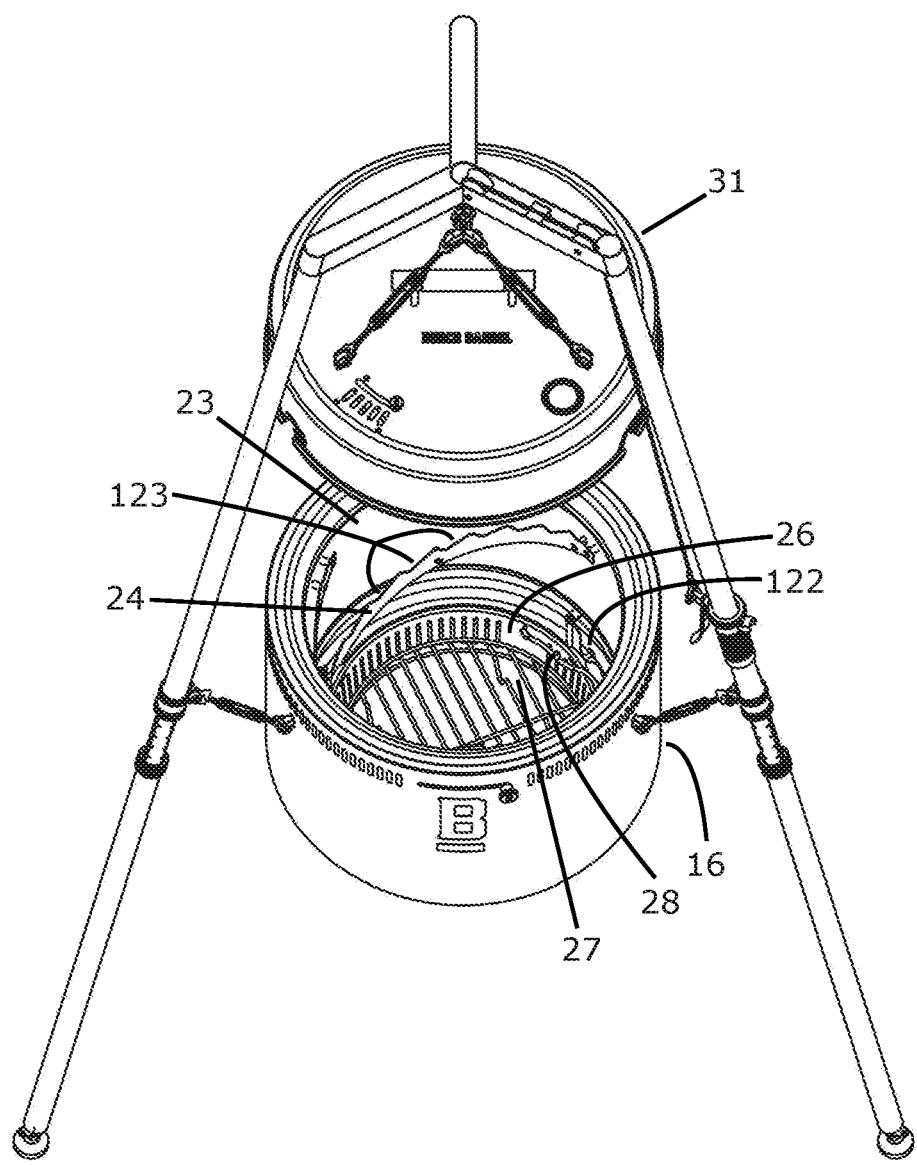

FIGS. 13A and 13B depict a top view of the tripod, with FIG. 13A showing the fire pan (26) in a raised position within the barrel, and FIG. 13B depicting the fire pan (26) in a recessed position, with the fire pan studs (122) engaging with the fire pan adjustment steps (123) to maintain the fire pan (26) in a recessed position. Thus, the fire pan (26) is positioned inside of the insert (23), and in FIG. 13A it is nearly or at the top of the barrel, while in FIG. 13B the fire pan (26) is in a recessed position, i.e., farthest from the top of the barrel.

Figures 14A, 14B:
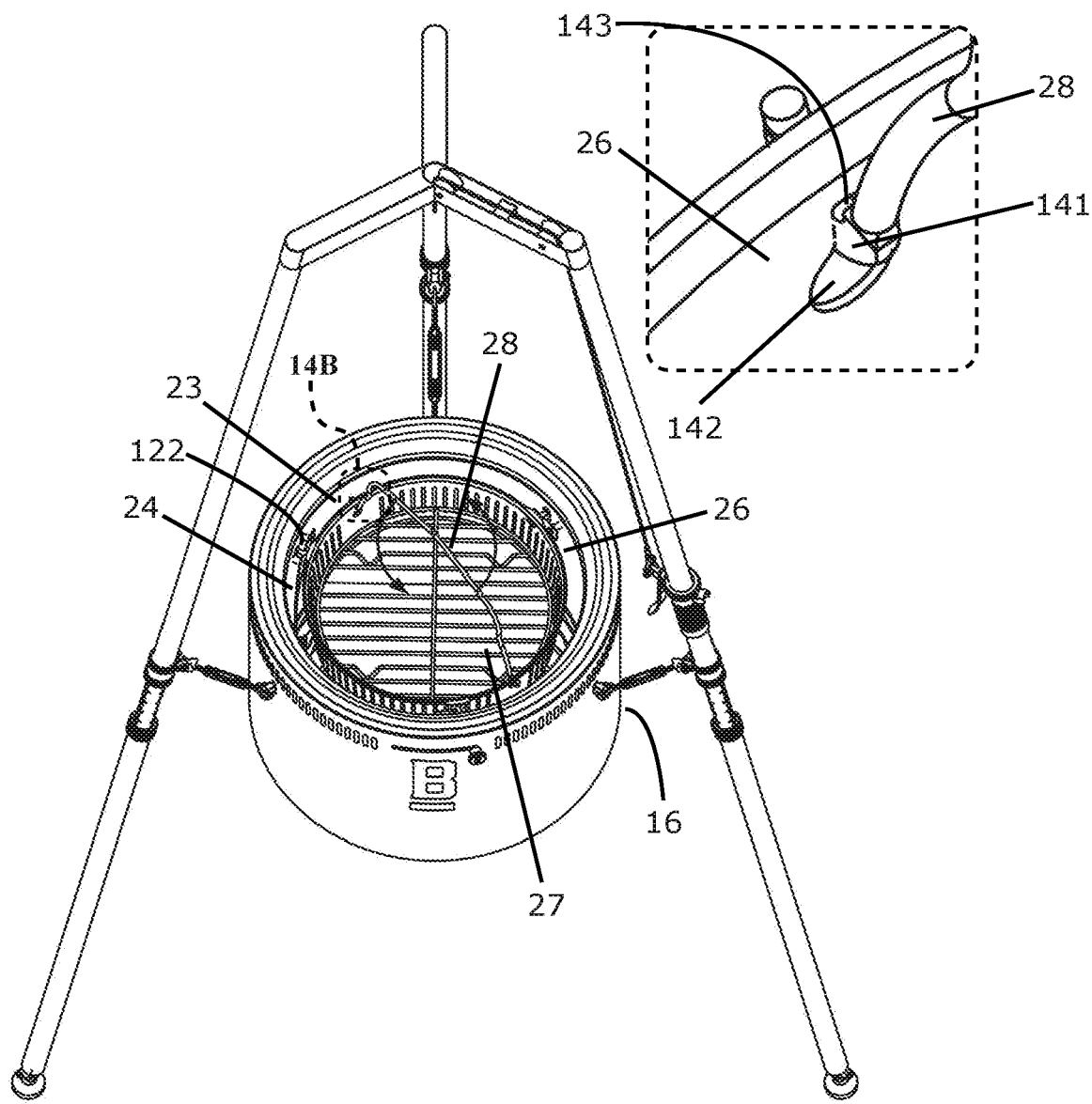
FIGS. 14A-14C depict views of a fire pan for rotational purposes to raise or lower the fire pan, with FIG. 14A depicting the tripod and depicting arrows of the rotation, FIG. 14B depicting the latch handle, and FIG. 14C depicting the fire pan in a lowered position.
Figure 14C:
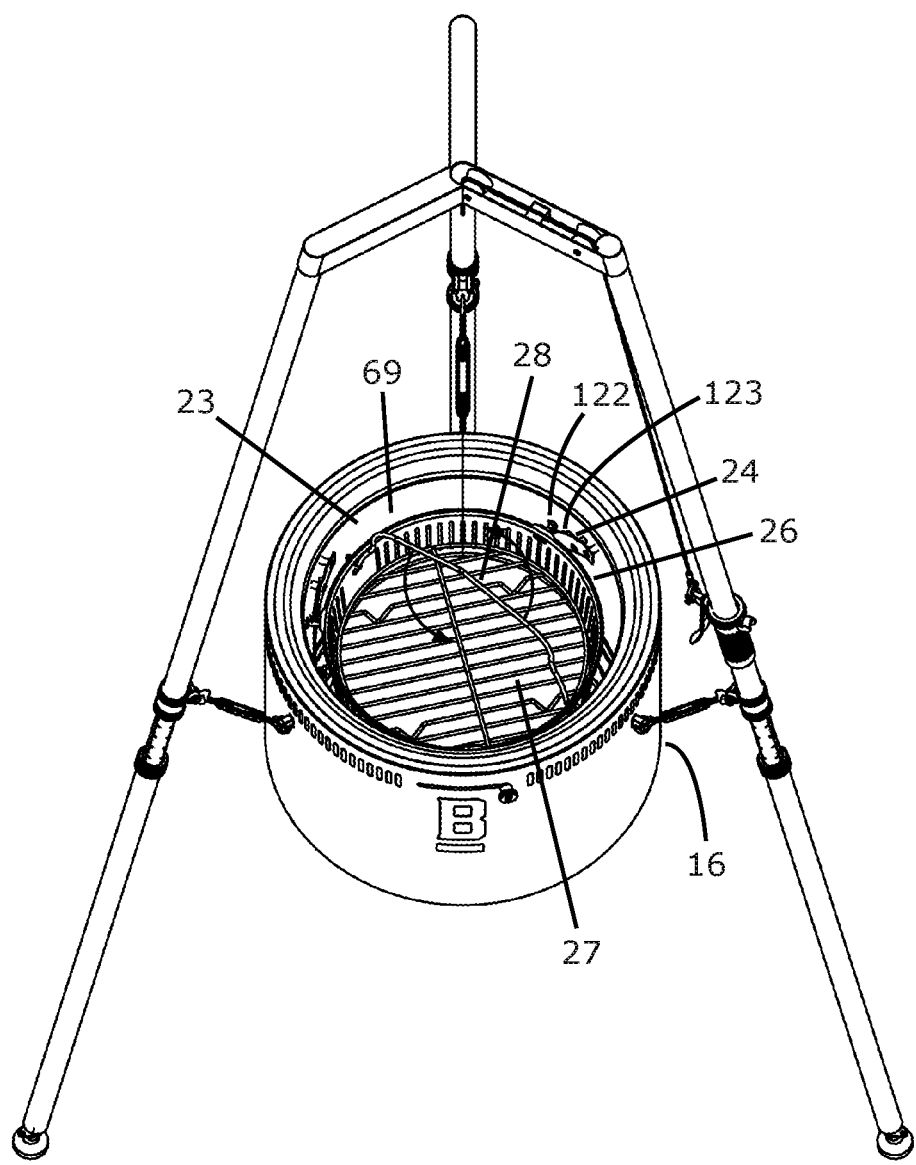

FIGS. 14A, 14B, and 14C depict the fire pan with the lid removed entirely. The wire (47) may contain a hook element at the distal end to selectively attach the lid in place. Accordingly, it may be optionally removed. The fire pan (26) is depicted in a raised position in FIG. 14A, and the attachment of the fire pan handle (28) is shown, with the handle lock hook (141), the handle pivot slot (142), and the handle lock slot (143) allowing the handle (28) to be rotated (as indicated by the arrows) to be lifted and/or rotate the entire fire pan (26) so as to engage a higher or lower fire pan adjustment step (123). The handle lock slot (143) creates a recessed section wherein when the handle (28) is in a vertical position, the handle (28) itself is locked or rigid with the fire pan (26). This ensures that if the weight on the fire pan is uneven, the fire pan (26) will not tilt and spill the components. This is a safety issue, especially where the contents are hot, but also a cleanliness issue, as if the fire pan (26) is holding ashes for disposal. By lowering the handle, the lock feature is disengaged and the handle (28) and fire pan (26) will swing.

The locked or unlocked position, however, will not impact the ability to rotate the fire pan (26) to raise or lower on the fire pan adjustment steps (123). Indeed, FIG. 14C depicts the fire pan (26) being in a slightly recessed position as compared to FIG. 14A, as the fire pan stud (122) is shown engaged to a lower fire pan adjustment step (123) on the tracks (24), revealing more of the insert interior face (69).

Figure 15A:
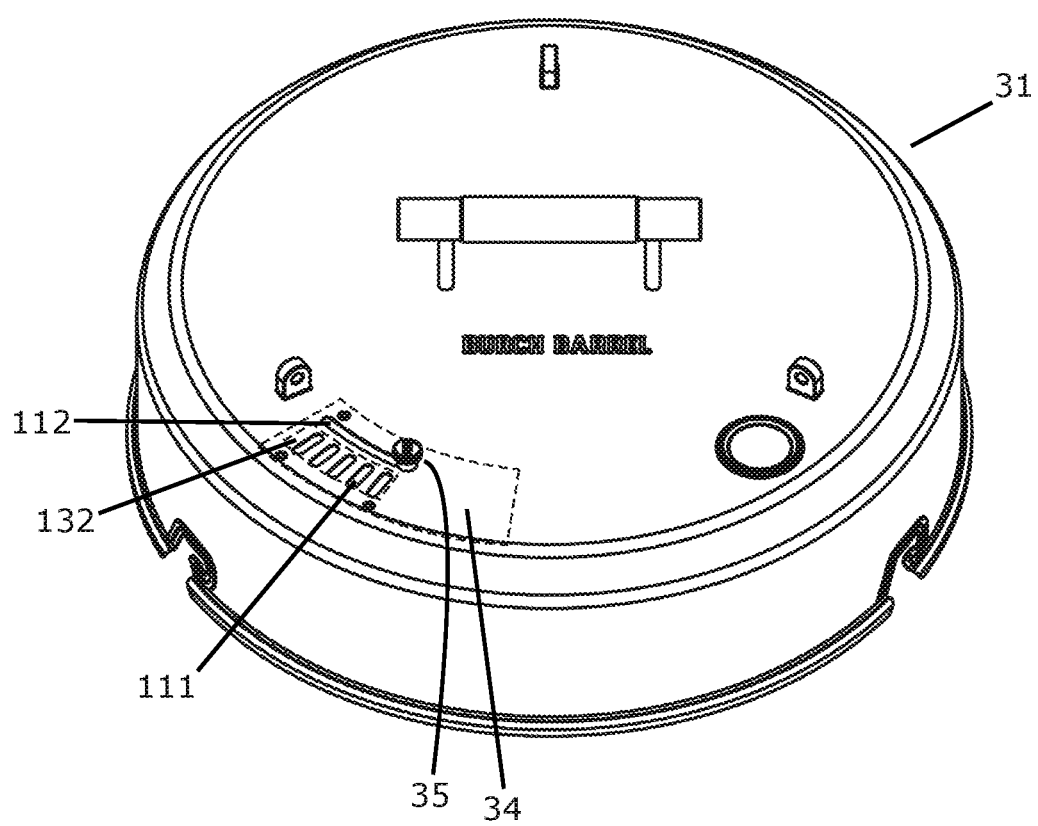
FIGS. 15A and 15B depict views of a lid with a vent system, with FIG. 15A depicting an open position and FIG. 15B depicting a closed position.
Figure 15B:
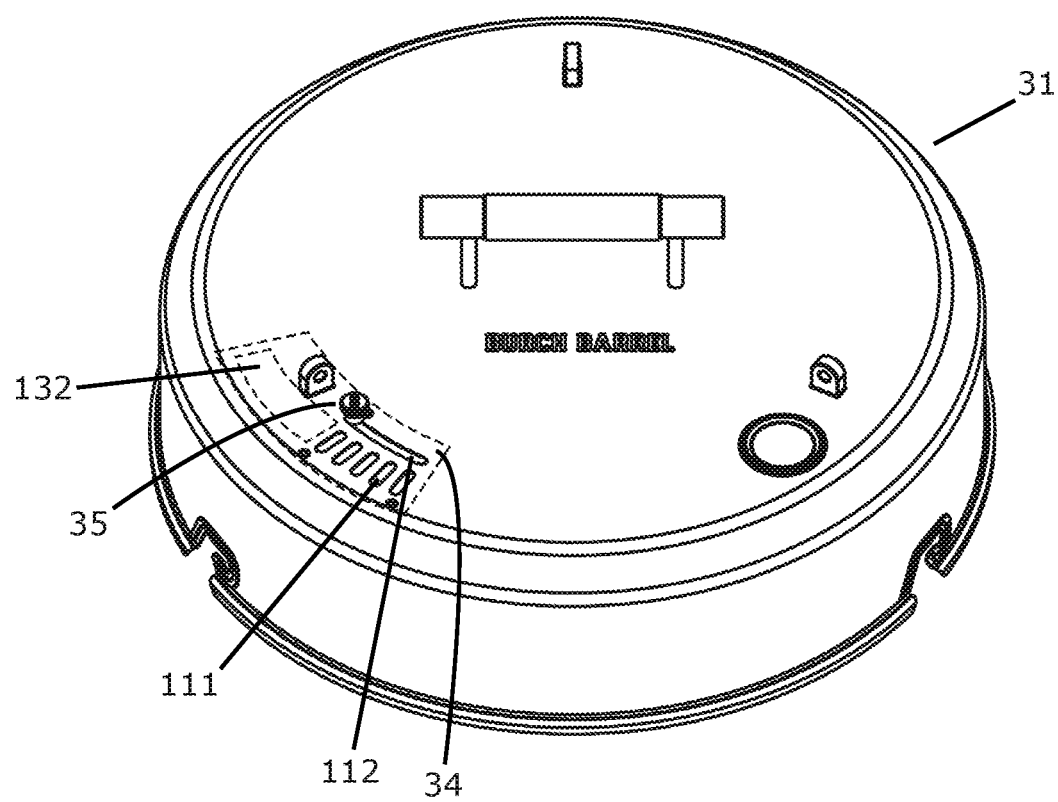

FIGS. 15A and 15B depict the lid (31), and specifically feature the lid vent (34), the lid vent knob (35), the lid vent slots (111), the lid vent knob track (112), and the lid vent opening (132). The vent allows for a slideable component, the lid vent (34), to move from a first position, i.e., the open vent position of FIG. 15A, to the closed position of FIG. 15B, by sliding the lid vent knob (35) in the lid vent knob track (112). This places a vent in the lid (31) itself by means of a plurality of lid vent slots (111) and another hole (lid vent opening [132]) in the lid vent (34). The lid vent (34) may then cover the lid vent slots (111). Where the lid vent slots (111) are over the lid vent opening (132), the lid is vented and air escapes through the lid vent slots (111). Where the lid vent slots (111) are over the closed portion of the lid vent (34), as in FIG. 15B, then airflow is reduced or prevented. The lid (31) also may optionally contain a thermometer (36) as depicted in the exploded view of FIG. 2D.

Figure 16:
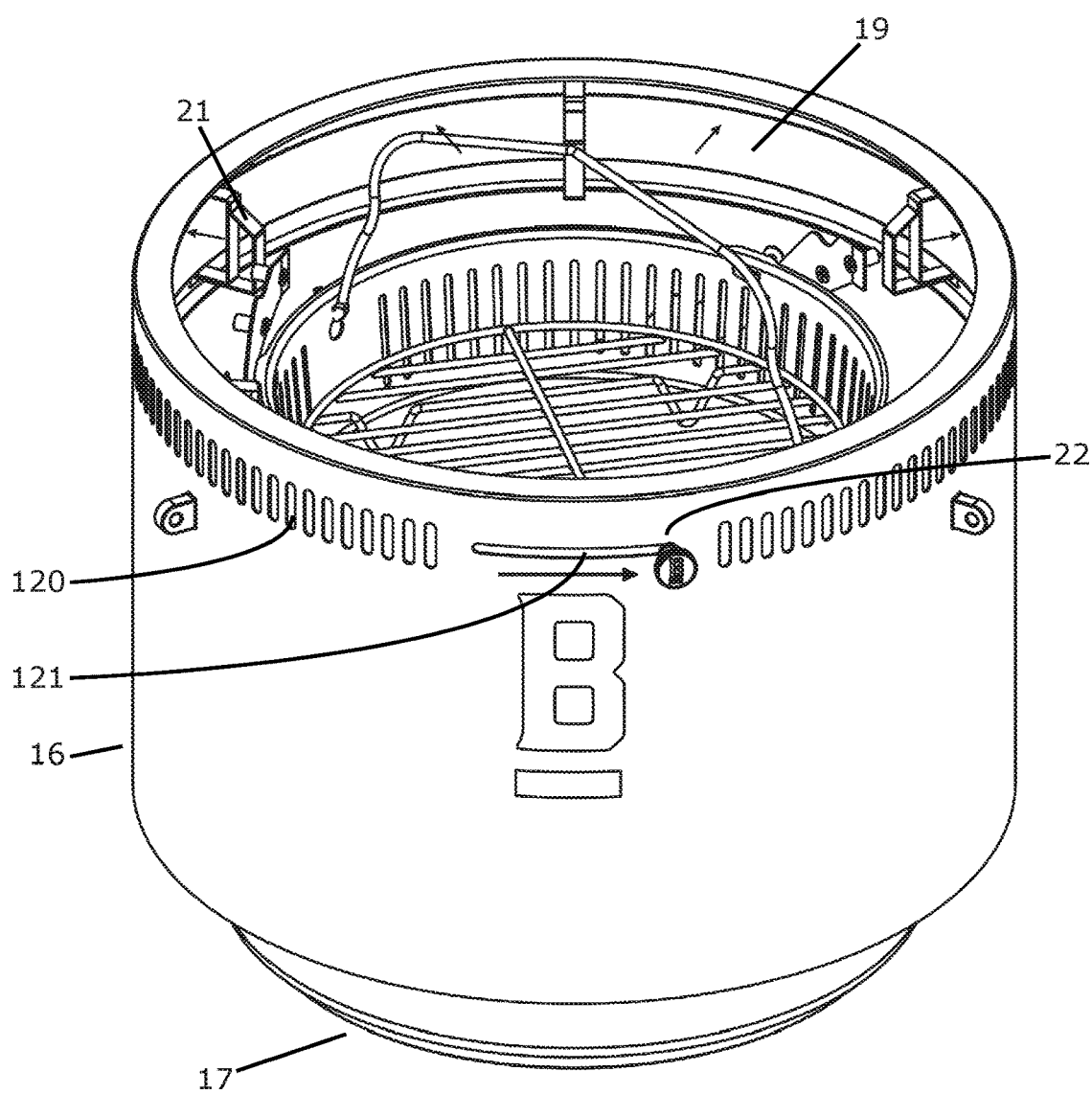
FIG. 16 depicts a venting system in a closed position

FIG. 16 details a further venting element for the barrel itself, with vent slots (120) disposed in a circumferential ring around the perimeter of the shell side (16). The vent slots (120) allow the interior void to receive oxygenated air, which improves combustion and is useful for reducing the amount of smoke produced by the barrel. These vent slots (120), however, can be opened and closed based on the needs of the user. To open and close the vent slots (120), a vent band (19) is devised to operate to open and close the vent slots (120). The vent band (19) is simple in application as it is a length of material, having a first end (134) and a second end (135). The first end (134) is secured to the outer shell interior face (68), and the second end (135) is attached to the vent knob (22). At least one vent cleat (21) supports the vent bend (19) so it is maintained in vertical orientation along the vent slots (120). When the vent band (19) is in a closed position, the vent band (19) is pressed against the outer shell interior face (68) directly over the vent slots (120), thus reducing or eliminating air flow through said vent slots (120). However, when the vent knob (22) is moved to the left within the vent knob track (121), it pulls the vent band (19) away from the outer shell interior face (68), so that the vent band (19) is noncontiguous with the outer shell interior face (68). This allows air to pass through the vent slots (120) and through the air void (71) and ultimately toward the fire pan (26) where it can be used in combustion.

Figure 17:
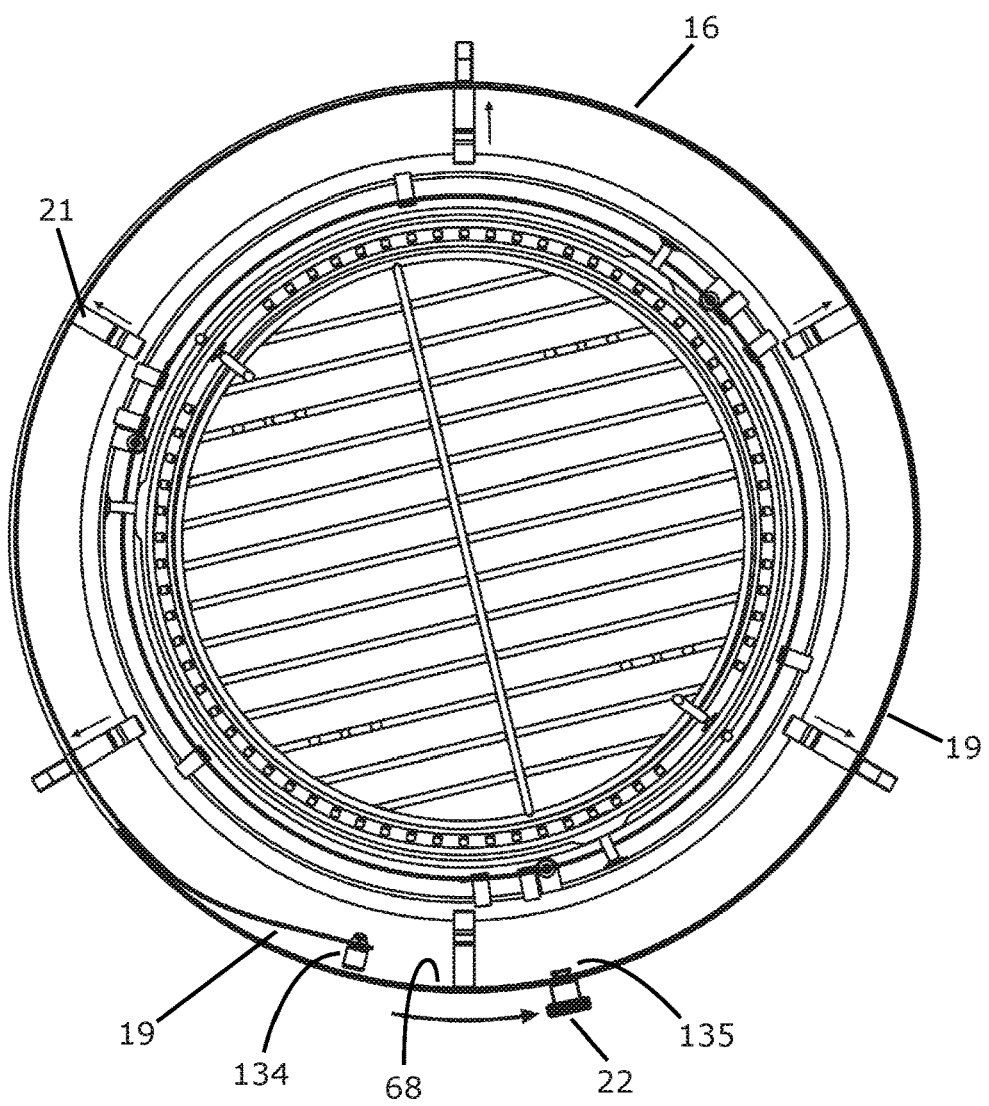
FIG. 17 depicts a venting system in a closed position from a top plan view, depicting the vent band in a flush position against the interior wall of the barrel.
Figure 18:
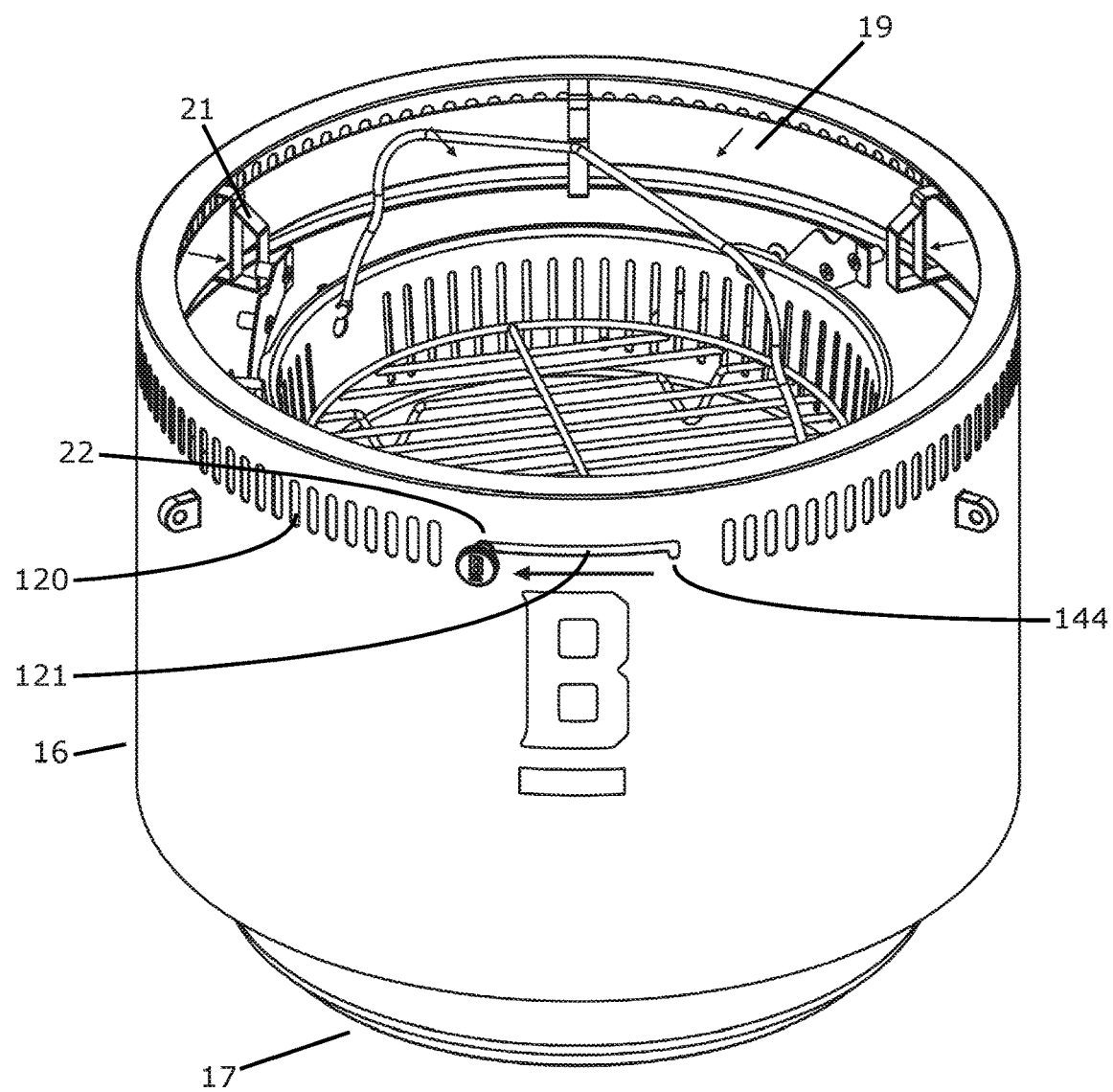
FIG. 18 depicts a venting system in an open position, with the vent band pulled away from the interior wall of the barrel.
Figure 19:
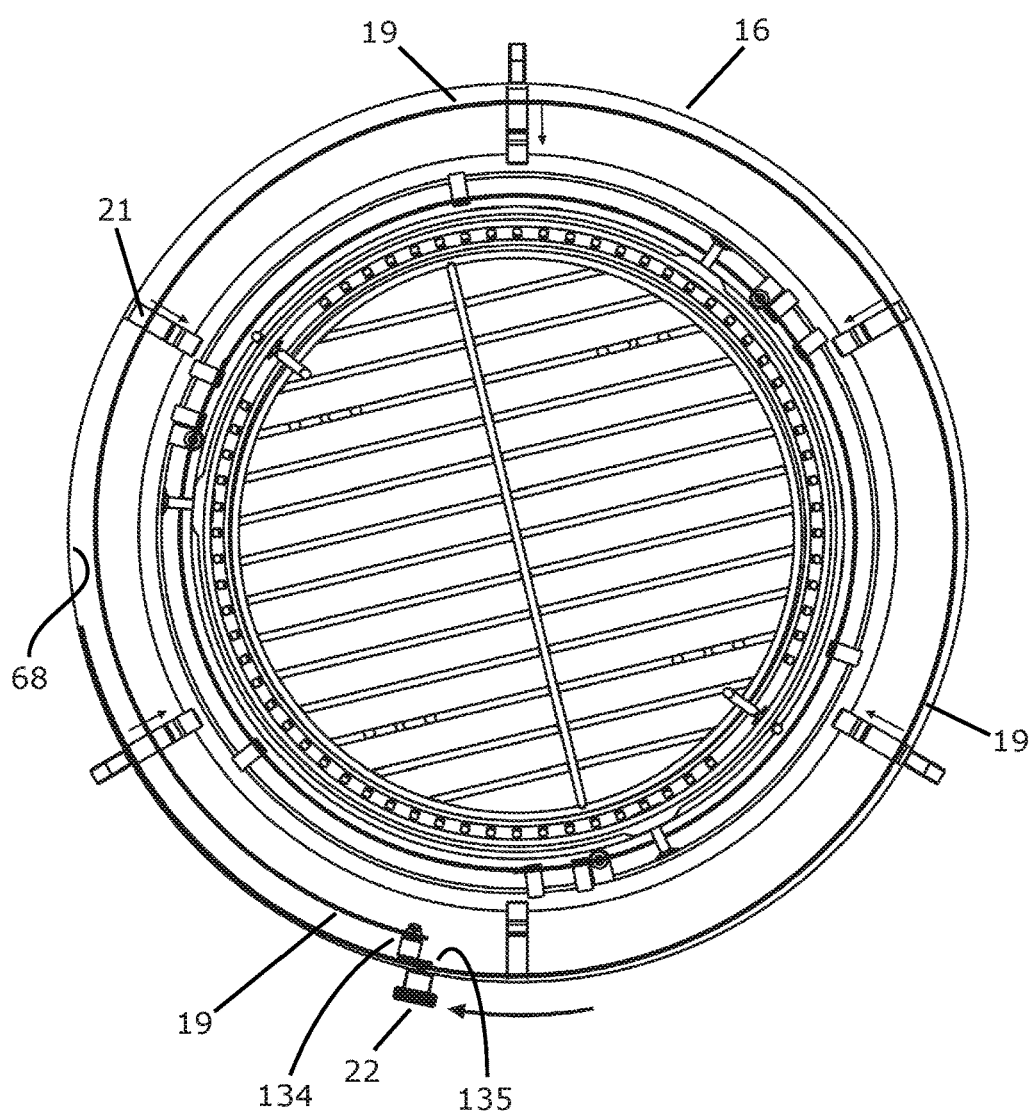
FIG. 19 depicts a venting system in an open position from a top plan view.
Figure 20:
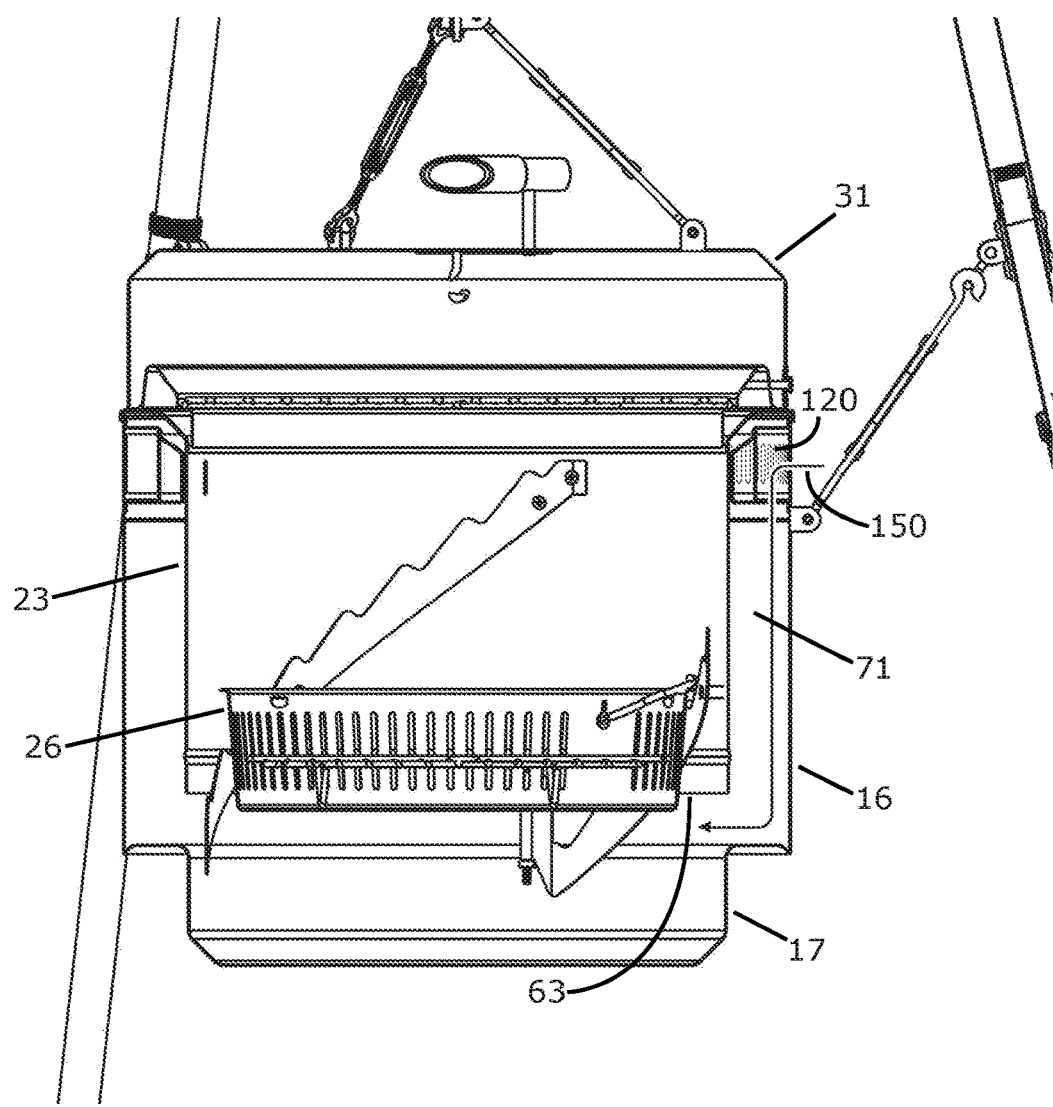
FIG. 20 depicts a cross sectional view of a barrel with fire pan and positional system and details of airflow.

FIG. 17 shows a top plan view of the vent band (19) with it pressed against the outer shell interior face (68). By contrast, FIG. 18 depicts the open position, with the vent band (19) pulled away from the outer shell interior face (68). In the locked or closed position, as depicted in FIG. 18 there is a vent knob lock slot (144), that forms a slot for maintaining the vent knob (22) in the locked position. FIG. 19 depicts a top plan view of the vent band (19) in the open position, which provides space between the vent band (19) and the outer shell interior face (68) such that the air can pass through the vent slots (120) as depicted in FIG. 20. FIG. 20 depicts a cross sectional view with airflow arrow (150) depicting the flow of air through the air void (71) and under the insert bottom (63), which provides air to the bottom of the fire pan (26).

The figures and description of the several embodiments herein describe a barbeque barrel that can be easily converted from a barbeque with a grate (30) to a burn barrel for providing open flames. In preferred embodiments, the barrel is hung from a standing structure, preferably a tripod. However, those of skill in the art will recognize that the tripod can be expanded to include four, five, or more legs as necessary for stability or aesthetics.

In a particular embodiment, a barrel system comprising a barrel shell, an insert, a fire pan, a lid, and a tripod. The lid (31) and tripod particularly comprising a pulley system comprising a leg-based lever, which biases into a locked position under a load. The design of the pulley having the proximal end attached to a handle (48) and the distal end attached to a load (lid [31]), biases the lever up, and presses the lock (50) against the leg. In this biased state, the pulley system is static. Compressing the lever then unbiases the locking member, thus allowing it to slide on the leg either in a vertical or horizontal manner.

This suspension system is further advantageously utilized with a unique lid (31) and grate locking system, which allows for securing a grate (30) and lifting said grate. The grate is positioned within a collar (29), said collar comprising a collar shelf (139) formed by a collar top (65) and a collar bottom (64), providing the shelf based on the difference in the diameter of the collar (29) components. Thus, the grate (30) rests within the collar top (65) and situated on the shelf created by the collar bottom (64). The collar (29) comprises at least one collar lock stud (115) extending from the collar top (65), which is configured to be received within a collar lock slot (116) within the lid. The collar lock stud (115) can then be locked into position in the collar lock slot (116) and the entirety of the collar (29), the grate (30), and the lid (31) can be lifted via the suspension system.

Furthermore, in controlling heat and distance, the fire distance can also be adjusted, with an adjustable fire pan track system. As detailed in the several figures, the track system comprises a series of tracks (24), each having a series of fire pan adjustment steps (123), wherein the steps are configured to receive a stud positioned on the exterior face of the adjustable fire pan. By rotating the fire pan (26), the stud moves to a different fire pan adjustment step (123), effectively raising or lowering the relative position of the fire pan (26) within the barrel.

The fire pan (26), however, is removable, and a locking system is provided to prevent the tipping of the fire pan when it holds an uneven load. Thus, a handle is provided that locks into a slot when the handle is in a vertical position, preventing the fire pan (26) from swinging in said vertical handle position.

The barrel also utilizes a unique venting system. A band of metal, for example stainless steel, which biases toward a straight configuration, is attached at one end to the interior face of the barrel. The metal, wanting to be biased straight and not curved (being spring like in nature), is attached to a knob, to move the vent band (19) to an open or closed position. By pulling the band away from the interior face of the barrel, the vent slots in the side of the barrel are opened to allow air to pass through, and when closed prevent air from traveling into the barrel. This allows selective airflow considerations for the user.

By opening the vents in the side of the barrel and with incorporation of the insert, the air is forced in a top-down manner into the void of the barrel, where the fuel is being combusted. When burning an open flame fire, this greatly aids in the reduction of smoke, and allows for a hot fire to burn. When using charcoal, the necessary air can be reduced to burn and then let the embers remain.

These features as described herein are advantageously utilized alone or in combination with one another. The materials to manufacture and use the invention are understood by those of ordinary skill in the art, namely, the barrel is to hold and contain fire, and thus the materials must be able to withstand such temperatures, typically through metal materials and metal alloys. Additional components may be made of ceramic or other temperature stable components known to those of ordinary skill in the art.

Those of ordinary skill in the art will recognize that certain features are omitted, as these are routinely understood by those of ordinary skill in the art and thus need no further description. Furthermore, those of ordinary skill in the art will recognize that alterations and modifications may be made to the invention without deviating from the spirit of the invention, and that the invention is therefore not merely limited by the drawings herein.

What is claimed is:

1. A modular hanging barrel system comprising:
a cylindrical-shaped barrel having an exterior wall, an interior wall, a top rim, a top aperture defining a void within the cylindrical barrel; wherein the void is defined and configured to receive a tubular insert, said insert comprising an aperture at a top end and a bottom end, a wall connecting the top and bottom, said wall having an exterior insert wall face and an interior wall face and a flange positioned circumferentially around the top of the insert; said flange defined to be retained on the top rim of the barrel and said wall being positioned within the void, said flange maintaining said insert at a position within the top aperture;
a lid, said lid defined and configured to engage to an open end of a barrel, said lid comprising a locking feature, said locking feature locking said lid to a collar, said collar defined as a ring-shaped piece having a collar top and a collar base with said collar base having a smaller exterior diameter than said collar top and a smaller interior diameter than said collar top, said smaller interior diameter defining a shelf for receiving a grate;
and a support structure sized to support the cylindrical-shaped barrel, said support structure comprising hanging elements for hanging the cylindrical-shaped barrel.

2. The modular hanging barrel system of claim 1 comprising at least one bracket on said exterior wall, said at least one bracket connected to said hanging elements to hang said cylindrical-shaped barrel.

3. The modular hanging barrel system of claim 1 comprising a fire pan, said fire pan disposed of within said tubular insert.

4. The modular hanging barrel system of claim 1 comprising a pulley system, said pulley system comprising a wire having a first end and a second end, a grip body attached to said first end, and a connector attached to said second end; said grip body attached to said support structure and said grip body comprising a hinged locking member configured to bias said locking member into a locked position.

5. A modular barbeque system comprising: a tripod, an adjustable pulley system, a barrel, and an attachable lid; said tripod comprising three legs, each leg having a top and a base, each of said three legs being attached together at said top to create said tripod; said adjustable pulley system comprising a length of line having a proximal end attached to a grip slider and a distal end attached to a connecting feature, said grip slider being slidably positioned on one of said three legs, said connecting feature connecting to a lid; said lid defined and configured to engage to an open end of a barrel and said lid comprising a locking feature, said locking feature locks said lid to a collar, said collar defined as a ring-shaped piece having a collar top and a collar base with said collar base having a smaller exterior diameter than said collar top and a smaller interior diameter than said collar top, said smaller interior diameter defining a shelf for receiving a grate; said barrel comprising an exterior shell having a wall having an exterior and interior face, and a top aperture having a top lip, and a cylindrical insert comprising a top, a bottom, and a side wall, said top comprising a circumferential flange, and wherein said flange is configured and defined to be received on said top lip on said barrel.

6. The modular barbeque system of claim 5 wherein within a passage is a fire pan, said fire pan being selectively adjustable in a vertical direction within said barbeque system.

7. The modular barbeque system of claim 5 wherein said shell comprises a plurality of circumferentially aligned openings in said shell wall, and an adjustable internal expansion vent system, said vent system comprising a vent band, said vent band having a first end and a second end, said first end connected to an internal face of said shell, and said second end connected to a slideable knob, said vent band capable of being moved between an open and a closed position, with said closed position forcing said vent band against the internal face of said shell over said circumferentially aligned openings in said shell wall.

8. The modular barbeque system of claim 7 wherein said adjustable internal expansion vent system draws air through said circumferentially aligned openings, into a void between said internal shell wall and an exterior wall of said insert.

* * * * *